(12) United States Patent
Campbell

(10) Patent No.: US 12,135,729 B2
(45) Date of Patent: Nov. 5, 2024

(54) ELECTRONIC NOTE MANAGEMENT VIA A CONNECTED ENTITY GRAPH

(71) Applicant: Palantir Technologies Inc., Denver, CO (US)

(72) Inventor: James Campbell, New York City, NY (US)

(73) Assignee: Palantir Technologies Inc., Denver, CO (US)

(*) Notice: Subject to any disclaimer, the term of this patent is extended or adjusted under 35 U.S.C. 154(b) by 0 days.

(21) Appl. No.: 18/526,861

(22) Filed: Dec. 1, 2023

(65) Prior Publication Data

US 2024/0104110 A1    Mar. 28, 2024

Related U.S. Application Data

(63) Continuation of application No. 17/972,409, filed on Oct. 24, 2022, now Pat. No. 11,836,149, which is a continuation of application No. 17/084,502, filed on Oct. 29, 2020, now Pat. No. 11,481,407, which is a
(Continued)

(51) Int. Cl.
| | |
|---|---|
| *G06F 16/95* | (2019.01) |
| *G06F 3/04842* | (2022.01) |
| *G06F 3/04847* | (2022.01) |
| *G06F 16/22* | (2019.01) |
| *G06F 16/2457* | (2019.01) |
| *G06F 16/248* | (2019.01) |
| *G06F 16/901* | (2019.01) |
| *G06F 16/9535* | (2019.01) |

(52) U.S. Cl.
CPC ........ *G06F 16/248* (2019.01); *G06F 3/04842* (2013.01); *G06F 3/04847* (2013.01); *G06F 16/2291* (2019.01); *G06F 16/24575* (2019.01); *G06F 16/9024* (2019.01); *G06F 16/9535* (2019.01)

(58) Field of Classification Search
CPC .......... G06F 16/24575; G06F 16/9535; G06F 16/2291; G06F 16/248; G06F 16/9024
See application file for complete search history.

(56) References Cited

U.S. PATENT DOCUMENTS 6,496,850 B1 * 12/2002 Bowman-Amuah ........................ G06F 9/4493 709/224
6,502,213 B1 * 12/2002 Bowman-Amuah ........................ G06F 9/4812 710/266
6,529,909 B1 * 3/2003 Bowman-Amuah ........................ G06F 16/258

(Continued)

*Primary Examiner* — Eliyah S. Harper
(74) *Attorney, Agent, or Firm* — Duane Morris LLP

(57) ABSTRACT

A computer-implemented method is disclosed. The method comprises managing, by a processor, a connected entity graph of nodes and edges, each node of the nodes representing an entity having an entity type of a plurality of entity types, at least one node of the nodes having an entity type of an electronic note, each edge of the edges representing a relationship between two entities; receiving a request for a search specifying a beginning entity, a linking parameter, and a filter on the linking parameter, the linking parameter specifying a property of an intermediary entity linking a source entity and a target entity during the search, the filter constraining a value of the property; searching the connected entity graph based on the request; causing a display of a search result.

20 Claims, 25 Drawing Sheets

Related U.S. Application Data continuation of application No. 14/856,548, filed on Sep. 16, 2015, now Pat. No. 10,853,378.

(60) Provisional application No. 62/209,720, filed on Aug. 25, 2015.

(56) References Cited

U.S. PATENT DOCUMENTS

| | | | |
|---|---|---|---|
| 6,888,554 B1 | 5/2005 | Decombe | |
| 8,584,099 B1* | 11/2013 | Abi-Antoun | G06F 8/10 |
| | | | 717/133 |
| 9,122,745 B2* | 9/2015 | Akolkar | G06F 16/243 |
| 9,262,202 B2* | 2/2016 | Tripp | G06F 8/73 |
| 9,443,004 B2* | 9/2016 | Chan | H04L 41/14 |
| 9,501,761 B2* | 11/2016 | Richards | G06F 21/6254 |
| 9,891,791 B1 | 2/2018 | Khan et al. | |
| 10,437,652 B2* | 10/2019 | Prewitt, Jr. | G06F 9/542 |
| 10,509,832 B2* | 12/2019 | Sauper | G06F 16/248 |
| 10,761,521 B2* | 9/2020 | Lutz | G05B 19/0426 |
| 10,853,378 B1 | 12/2020 | Campbell | |
| 10,996,945 B1* | 5/2021 | Allen | G06F 8/30 |
| 11,327,989 B2* | 5/2022 | Wu | G06F 16/254 |
| 2005/0192956 A1 | 9/2005 | Evans | |
| 2009/0319993 A1* | 12/2009 | Denver | G06F 8/24 |
| | | | 717/121 |
| 2011/0004581 A1* | 1/2011 | Schmidt | G06F 17/11 |
| | | | 707/769 |
| 2014/0188862 A1* | 7/2014 | Campbell | G06F 16/24575 |
| | | | 707/728 |
| 2014/0188899 A1* | 7/2014 | Whitnah | G06F 16/9535 |
| | | | 707/751 |
| 2014/0337371 A1* | 11/2014 | Li | G06F 16/243 |
| | | | 707/767 |
| 2015/0030106 A1 | 1/2015 | Hashida | |
| 2015/0033106 A1 | 1/2015 | Stetson et al. | |
| 2015/0254214 A1 | 9/2015 | Rosenberg | |
| 2015/0331877 A1 | 11/2015 | Lou et al. | |
| 2015/0332670 A1* | 11/2015 | Akbacak | G10L 15/18 |
| | | | 704/9 |
| 2015/0340024 A1 | 11/2015 | Schogol et al. | |
| 2016/0026713 A1* | 1/2016 | Katic | G06F 16/28 |
| | | | 707/723 |
| 2016/0034181 A1 | 2/2016 | Norris, III | |
| 2016/0042069 A1* | 2/2016 | Lee-Goldman | G06Q 50/00 |
| | | | 707/706 |
| 2021/0049164 A1 | 2/2021 | Campbell | |

\* cited by examiner

ELECTRONIC NOTE MANAGEMENT VIA A CONNECTED ENTITY GRAPH

CROSS-REFERENCE TO RELATED APPLICATION(S)

This application claims the benefit under 35 U.S.C. § 120 as a Continuation of U.S. patent application Ser. No. 17/972,409, filed Oct. 24, 2022, which is a Continuation of U.S. patent application Ser. No. 17/084,502, filed Oct. 29, 2020, now U.S. Pat. No. 11,481,407, issued Oct. 25, 2022, which is a Continuation of U.S. patent application Ser. No. 14/856,548, filed Sep. 16, 2015, now U.S. Pat. No. 10,853,378, issued on Dec. 1, 2020, which claims the benefit under 35 U.S.C. § 119(e) of Provisional Application 62/209,720, filed Aug. 25, 2015, the entire contents of which are hereby incorporated by reference for all purposes as if fully set forth herein. The applicant hereby rescinds any disclaimer of claim scope in the parent applications or the prosecution history thereof and advises the USPTO that the claims in this application may be broader than any claim in the parent applications.

TECHNICAL FIELD

The subject innovations relate generally to electronic notes, and more particularly, to electronic note management systems with methodologies for organizing, accessing, and searching electronic notes.

BACKGROUND

Computers are very powerful tools for organizing, accessing, and searching information. One type of information that computers are useful for organizing, accessing, and searching is electronic text notes (or just "electronic notes"). Electronic notes include brief electronic recordings as text of facts, topics, or thoughts, recorded as an aid to memory or for subsequent recall, and short informal letters or messages recorded as text data in a computer. Electronic note management systems are a common mechanism for rapidly creating electronic notes on computer systems while providing easy access to users.

A typical electronic note management system organizes electronic notes in "records" having "fields" of information about the electronic notes. For example, an electronic note management system may have a record for each electronic note created by users of the system where each such record contains the text of the electronic note, an identifier of the user that created the note, a timestamp indicating when the user created the note, and one or more text "tags" that organize the note into one or more, possibly user-defined, categories such as, for example, "work," "home," "school," "recipes ideas," "meeting minutes," "tv shows to watch," "books to read," etc.

Existing electronic note management systems allow users to keyword search for electronic notes by various text properties of the electronic note records such as the text content and tag(s). Such systems can be effective for locating electronic notes that the searching user knows to exist a priori of the keyword search. For example, existing electronic note management systems can be effective in searching for and locating an electronic note that the searching user remembers previously creating and tagging.

One limitation of existing electronic note management systems is their limited ability to discover connections and relationships between electronic notes and other non-electronic note entities such as persons, places, things, and events that are related to the electronic notes in some way. For example, with existing electronic systems, it can be inefficient, cumbersome, and frustrating for a searching user to keyword search for and locate electronic notes that are not tagged with a keyword that matches a keyword of the search query. For example, an electronic note representing the minutes of a meeting may be tagged with the date and time and description of the meeting. However, the searching user may know only that a person named Alice attended the meeting but not know when the meeting occurred or the title or subject of meeting. In this case, keyword searching for "Alice" may not produce the electronic note as a search result unless the keyword "Alice" is part of the text content of the electronic note or the electronic note is tagged with the keyword "Alice".

What is needed is a method for organizing, accessing, and searching electronic notes. Ideally, the solution should allow a user to use a computer system to discover electronic notes through established relationships the notes have with other electronic notes or with non-electronic note entities such as persons, places, things, and events independent of whether the electronic notes are tagged with search query keywords, thereby improving the use and operation of the computer system. The subject innovations provide a solution for these and other needs.

DETAILED DESCRIPTION

Figure 1:
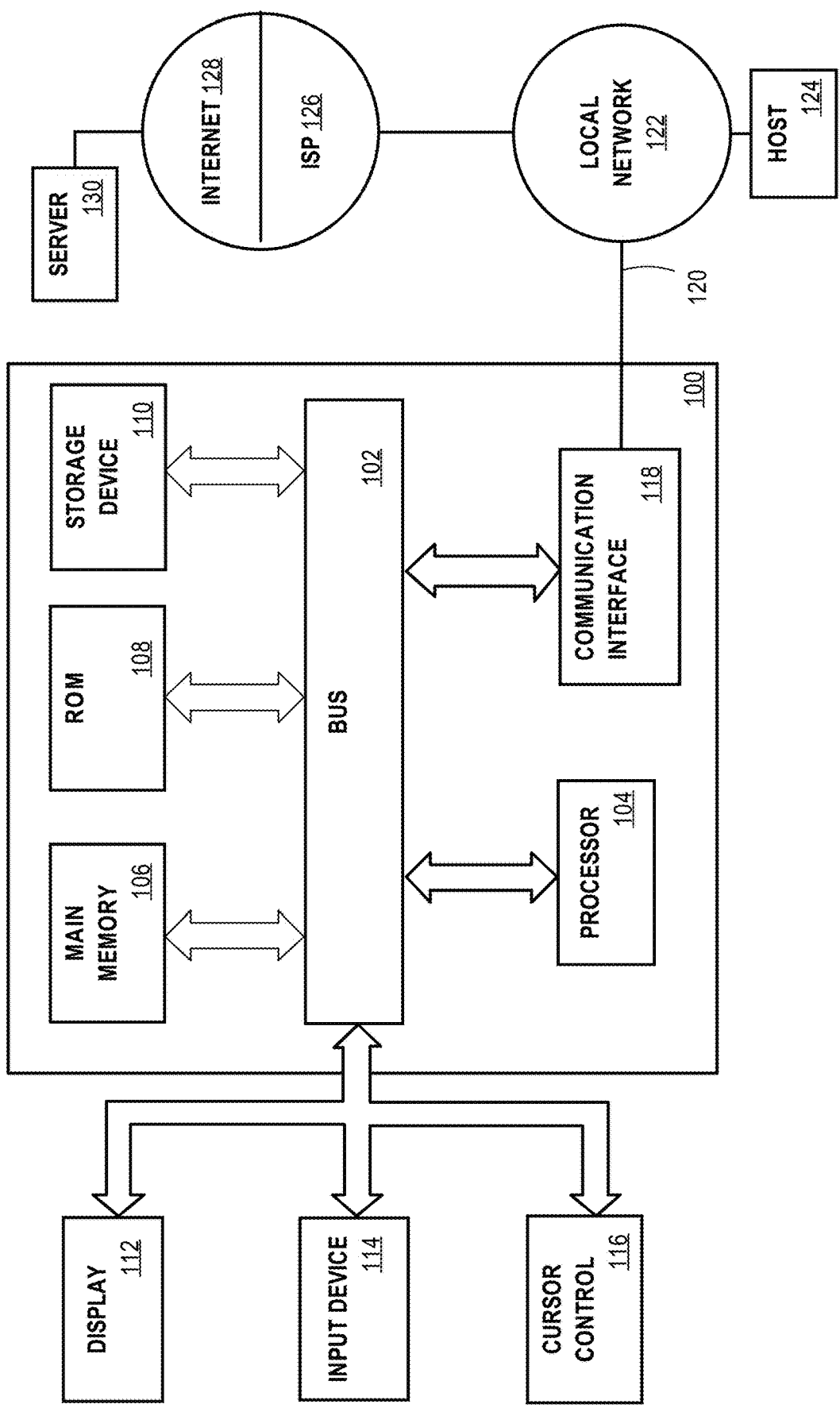
FIG. 1 is a very general block diagram of a computing device in which software-implemented processes of the subject innovations may be embodied.

In the following description, for the purposes of explanation, numerous specific details are set forth in order to provide a thorough understanding of the subject innovations. It will be apparent, however, that the subject innovations may be practiced without these specific details. In other instances, well-known structures and devices are shown in block diagram form in order to avoid unnecessarily obscuring the subject innovations.

General Overview

The subject innovations encompass systems, methods, and computer program code for using an electronic note management system for organizing, accessing, and searching electronic notes via a connected entity graph.

In some embodiments, the electronic note management system can be used to create the connected entity graph comprising electronic note entities and non-electronic note entities (e.g., persons, places, things, and events related to the electronic notes) and relationships between the entities. As just one example, the electronic note management system can be used to create the connected entity graph comprising a "project" entity, one or more "person" entities that each have a "working on" relationship with the "project" entity, and one or more electronic notes entities each having a "created by" relationship with one of the "person" entities.

In some embodiments, the electronic node management system can be used to create the connected entity graph comprising relationships between electronic note entities in the graph. As just one example, the electronic note management system can be used to create the connected entity graph comprising a "followed up by" relationship between a first electronic note having the "created by" relationship with a "person" entity and a second electronic note also having the "created by" relationship with the "person" entity.

In some embodiments, the electronic note management system can be used to create the connected entity graph comprising different types of entities, including different types of electronic note entities and different types of non-electronic note entities, and different relationships connecting the different entities in the graph.

According to various embodiments, users are provided better data modeling options for representing real-world relationships between electronic notes and other electronic notes and between electronic notes and real world entities such as persons, places, things, and events related to the electronic notes in some way.

Pursuant to some embodiments, connected entity graph visual explorer systems, methods, and computer program code are provided for exploring relationships, developing networks, and uncovering connections involving electronic notes including providing organizational capabilities such as altering visual layout of the connected entity graph and merging entities in the graph into groups.

Pursuant to some embodiments, the visual graph comprises nodes and edges connecting the nodes. The nodes in the visual graph represent entities of the connected entity graph. The edges connecting the nodes represent logical relationships that exist between the entities represented by the nodes in the connected entity graph.

Pursuant to some embodiments, electronic note visual search around systems, methods, and computer-program code are provided for visually searching for electronic notes in the connected entity graph which include choosing a starting entity in the connected entity graph and defining various linking and target parameters that customize the search. The result of the search is presented as a visual graph representation of entities and the relationships connecting them.

Various embodiments of the subject innovations are believed to provide desirable advantages from a data analysis standpoint, as the ability to discover complex relationships between electronic notes and other entities is made easy for the user for a variety of reasons, including: (i) the connected entity graph visual explorer provides the user a multitude of features for customizing a visual graph display to best suit the user's needs and maximize efficiency while at the same time serving as an access point for network exploration and pattern discovery features such as the visual search around feature, and (ii) the visual search around feature allows the user to define precise parameters to be used to explore the connected entity graph, including which entities should be used as linking parameters and which as targets of the search and how deep into the connected entity graph the search should delve.

Before discussing these and other embodiments of the subject innovations in greater detail, basic computer hardware and software for implementing the subject innovations are described.

Basic Computer-Based Implementation

Referring to the figures, exemplary embodiments of the subject innovations will now be described. The following description will focus on embodiments implemented in client and/or server software operating in a network-connected environment running under an operating system such as a UNIX operating system. The subject innovations, however, are not limited to any one particular application any particular environment. Instead, those skilled in the art would find that the system and methods of the subject innovations may be advantageously embodied on a variety of different computing platforms, including, LINUX, MICROSOFT WINDOWS, ANDROID, MAC OS, IOS, or the like. Accordingly, the description of the exemplary embodiments that follows is for purposes of illustration not limitation. The exemplary embodiments are primarily described with reference to block diagrams or flowcharts. As to the flowcharts, each block within the flowchart represents both a method step and apparatus element for performed the method step. Depending on the implementation, the corresponding apparatus element may be configured in hardware, software, firmware or a combination thereof Basic Computing Device Referring now to FIG. 1, it is a block diagram that illustrates a basic computing device 100 in which software-implemented processes of the subject innovations may be embodied. Computing device 100 and its components, including their connections, relationships, and functions, is meant to be exemplary only, and not meant to limit implementations of the subject innovations. Other computing devices suitable for implementing the subject innovations may have different components, including components with different connections, relationships, and functions.

Computing device 100 may include a bus 102 or other communication mechanism for addressing main memory 106 and for transferring data between and among the various components of device 100.

Computing device 100 may also include one or more hardware processors 104 coupled with bus 102 for processing information. A hardware processor 104 may be a general purpose microprocessor, a system on a chip (SoC), or other processor suitable for implementing the subject innovations.

Main memory 106, such as a random access memory (RAM) or other dynamic storage device, also may be coupled to bus 102 for storing information and instructions to be executed by processor(s) 104. Main memory 106 also may be used for storing temporary variables or other intermediate information during execution of software instructions to be executed by processor(s) 104.

Such software instructions, when stored in non-transitory storage media accessible to processor(s) 104, render computing device 100 into a special-purpose computing device that is customized to perform the operations specified in the instructions. The terms "instructions", "software", "software instructions", "program", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 100 also may include read only memory (ROM) 108 or other static storage device coupled to bus 102 for storing static information and instructions for processor(s) 104.

One or more mass storage devices 110 may be coupled to bus 102 for persistently storing information and instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 110 (e.g., the main hard disk for the device) stores a body of program and data for directing operation of the computing device, including an operating system, user application programs, driver and other support files, as well as other data files of all sorts.

Computing device 100 may be coupled via bus 102 to display 112, such as a liquid crystal display (LCD) or other electronic visual display, for displaying information to a computer user. In some configurations, a touch sensitive surface incorporating touch detection technology (e.g., resistive, capacitive, etc.) may be overlaid on display 112 to form a touch sensitive display for communicating touch gesture (e.g., finger or stylus) input to processor(s) 104.

An input device 114, including alphanumeric and other keys, may be coupled to bus 102 for communicating information and command selections to processor 104. In addition to or instead of alphanumeric and other keys, input device 114 may include one or more physical buttons or switches such as, for example, a power (on/off) button, a "home" button, volume control buttons, or the like.

Another type of user input device may be a cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

While in some configurations, such as the configuration depicted in FIG. 1, one or more of display 112, input device 114, and cursor control 116 are external components (i.e., peripheral devices) of computing device 100, some or all of display 112, input device 114, and cursor control 116 are integrated as part of the form factor of computing device 100 in other configurations.

Functions of the disclosed systems, methods, and modules may be performed by computing device 100 in response to processor(s) 104 executing one or more programs of software instructions contained in main memory 106. Such instructions may be read into main memory 106 from another storage medium, such as storage device(s) 110. Execution of the software program instructions contained in main memory 106 cause processor(s) 104 to perform the functions of the disclosed systems, methods, and modules.

While in some implementations, functions of the disclosed systems and methods are implemented entirely with software instructions, hard-wired or programmable circuitry of computing device 100 (e.g., an ASIC, a FPGA, or the like) may be used in place of or in combination with software instructions to perform the functions, according to the requirements of the particular implementation at hand.

The term "storage media" as used herein refers to any non-transitory media that store data and/or instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 110. Volatile media includes dynamic memory, such as main memory 106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 102. Transmission media can also take the form of acoustic or light waves, such as those generated during radio-wave and infra-red data communications.

Various forms of media may be involved in carrying one or more sequences of one or more instructions to processor(s) 104 for execution. For example, the instructions may initially be carried on a magnetic disk or solid-state drive of a remote computer. The remote computer can load the instructions into its dynamic memory and send the instructions over a telephone line using a modem. A modem local to computing device 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor(s) 104 retrieves and executes the instructions. The instructions received by main memory 106 may optionally be stored on storage device(s) 110 either before or after execution by processor(s) 104.

Computing device 100 also may include one or more communication interface(s) 118 coupled to bus 102. A communication interface 118 provides a two-way data communication coupling to a wired or wireless network link 120 that is connected to a local network 122 (e.g., Ethernet network, Wireless Local Area Network, cellular phone network, Bluetooth wireless network, or the like). Communication interface 118 sends and receives electrical, electromagnetic, or optical signals that carry digital data streams representing various types of information. For example, communication interface 118 may be a wired network interface card, a wireless network interface card with an integrated radio antenna, or a modem (e.g., ISDN, DSL, or cable modem).

Network link(s) 120 typically provide data communication through one or more networks to other data devices. For example, a network link 120 may provide a connection through a local network 122 to a host computer 124 or to data equipment operated by an Internet Service Provider (ISP) 126. ISP 126 in turn provides data communication services through the world wide packet data communication network now commonly referred to as the "Internet" 128. Local network(s) 122 and Internet 128 use electrical, electromagnetic or optical signals that carry digital data streams. The signals through the various networks and the signals on network link(s) 120 and through communication interface(s) 118, which carry the digital data to and from computing device 100, are example forms of transmission media.

Computing device 100 can send messages and receive data, including program code, through the network(s), network link(s) 120 and communication interface(s) 118. In the Internet example, a server 130 might transmit a requested code for an application program through Internet 128, ISP 126, local network(s) 122 and communication interface(s) 118.

The received code may be executed by processor 104 as it is received, and/or stored in storage device 110, or other non-volatile storage for later execution.

Basic Software System

Figure 2:
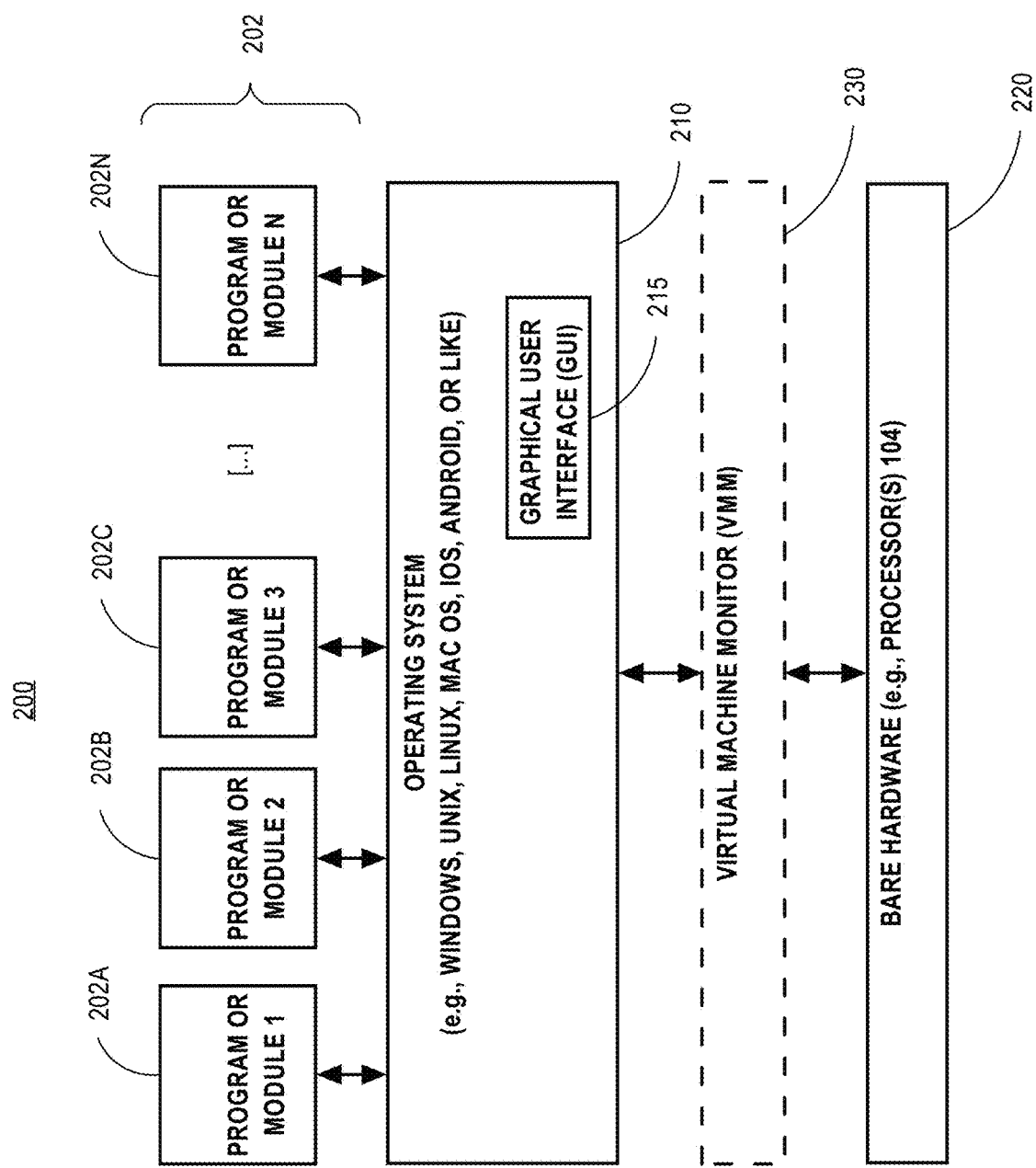
FIG. 2 is a block diagram of a basic software system for controlling the operation of the computing device.

FIG. 2 is a block diagram of a basic software system 200 that may be employed for controlling the operation of computing device 100. Software system 200 and its components, including their connections, relationships, and functions, is meant to be exemplary only, and not meant to limit implementations of the subject innovations. Other software systems suitable for implementing the subject innovations may have different components, including components with different connections, relationships, and functions.

In various embodiments, software system 200 is provided for directing the operation of computing device 100. Software system 200, which may be stored in system memory (RAM) 106 and on fixed storage (e.g., hard disk or flash memory) 110, includes a kernel or operating system (OS) 210. The OS 210 manages low-level aspects of computer operation, including managing execution of processes, memory allocation, file input and output (I/O), and device I/O. One or more application programs, represented as 202A, 202B, 202C . . . 202N in FIG. 2, may be "loaded" (e.g., transferred from fixed storage 110 into memory 106) for execution by the system 200. The applications or other software intended for use on device 200 may also be stored as a set of downloadable computer-executable instructions, for example, for downloading and installation from an Internet location (e.g., a Web server).

Software system 200 may include a graphical user interface (GUI) 215, for receiving user commands and data in a graphical (e.g., "point-and-click" or "touch gesture") fashion. These inputs, in turn, may be acted upon by the system 200 in accordance with instructions from operating system 210 and/or application(s) 202. The GUI 215 also serves to display the results of operation from the OS 210 and application(s) 202, whereupon the user may supply additional inputs or terminate the session (e.g., log off).

OS 210 can execute directly on the bare hardware 220 (e.g., processor(s) 104) of device 100. Alternatively, a hypervisor or virtual machine monitor (VMM) 230 may be interposed between the bare hardware 220 and the OS 210. In this configuration, VMM 230 acts as a software "cushion" or virtualization layer between the OS 210 and the bare hardware 220 of the device 100.

VMM 230 instantiates and runs one or more virtual machine instances ("guest machines"). Each guest machine comprises a "guest" operating system, such as OS 210, and one or more applications, such as application(s) 202, designed to execute on the guest operating system. The VMM 230 presents the guest operating systems with a virtual operating platform and manages the execution of the guest operating systems.

In some instances, the VMM 230 may allow a guest operating system to run as if it is running on the bare hardware 220 of device 100 directly. In these instances, the same version of the guest operating system configured to execute on the bare hardware 220 directly may also execute on VMM 230 without modification or reconfiguration. In other words, VMM 230 may provide full hardware and CPU virtualization to a guest operating system in some instances.

In other instances, a guest operating system may be specially designed or configured to execute on VMM 230 for efficiency. In these instances, the guest operating system is "aware" that it executes on a virtual machine monitor. In other words, VMM 230 may provide para-virtualization to a guest operating system in some instances.

The above-described computer hardware and software is presented for purpose of illustrating the basic underlying computer components that may be employed for implementing the subject innovations. The subject innovations, however, are not necessarily limited to any particular computing environment or computing device configuration. Instead, the subject innovations may be implemented in any type of system architecture or processing environment that one skilled in the art, in light of this disclosure, would understand as capable of supporting the features and functions of the subject innovations as presented herein.

Network-Connected Computing Environment

Figure 3:
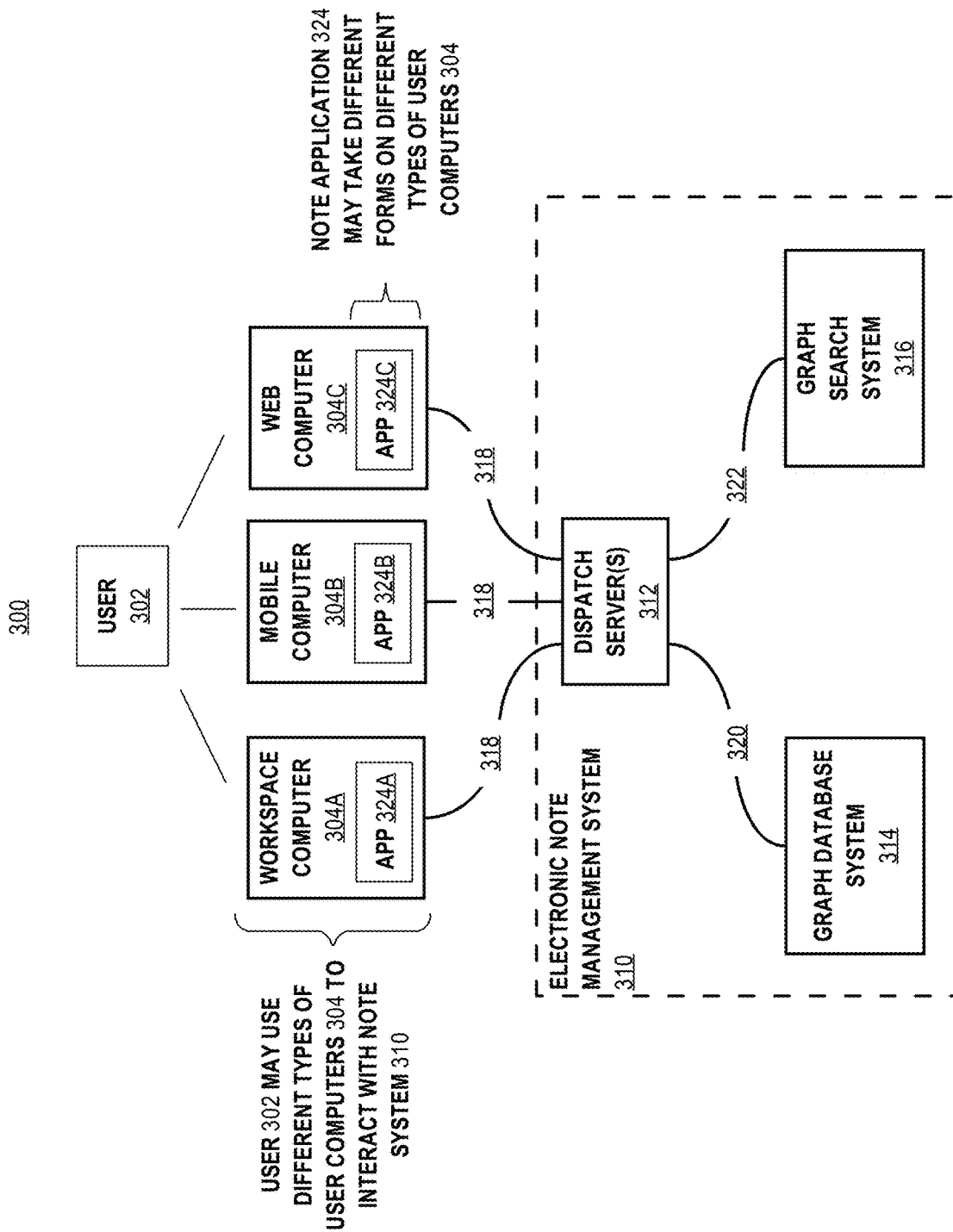
FIG. 3 is a block diagram of a networked computing environment in which the subject innovations are implemented in some embodiments.

While the subject innovations may be embodied in a single stand-alone computing device, the subject innovations may instead be implemented in a network-connected computing environment. Referring now to FIG. 3, it is a schematic of a network-connected computing environment 300 in which the subject innovations are implemented in some embodiments.

As shown, a human user 302 may have or use a user computer 304. The user computer 304 may be a workspace computer 304A, a mobile computer 304B, or a web computer 304C. The workspace computer 304A may be a desktop computer, a workstation computer, or other stationary computer. The mobile computer 304B may be a mobile phone, a laptop computer, a tablet computer, or other portable computing device. The web computer 304C can be a workspace computer 304A or a mobile computer 304B configured with conventional web browser application software which is configured to execute on the web computer 304C as an application (e.g., 202).

The user computer 304 may have or be operatively coupled to one or more display screens (e.g., 112) and have or be operatively coupled to one or more user input devices (e.g., 114 and/or 116). Pursuant to embodiments of the present invention, the user 302 may use the user computer 304 to organize, access, and search electronic notes via a connected entity graph by using the user input device(s) to cause the user computer 304 to interact over one or more data networks with the electronic note management computer system 310 (or just "note system 310" for the sake of brevity). Such interaction over the data network(s) may occur according to a application layer networking protocol such as, for example, the hypertext transfer protocol (HTTP), HTTP-secure (HTTPS), or the like. The data network(s) may include any number of different types of data networks (e.g., 122, 128, etc.) capable of carrying data in accordance with the application layer networking protocol.

To facilitate the interaction between the user computer 304 and the note system 310 as caused by the user 302 using the user input device(s) of the user computer 304, the user computer 304 may be configured with an electronic note software application 324 (or just "note application 324" for brevity). The note application 324 may drive a graphical user interface (e.g., 215) presented on the display screen(s) of the user computer 304, formulate the data payloads of network requests (e.g., HTTPS requests) that are sent by the user computer 304 over the data network(s) to the note system 310 in response to application events such as, for example, receiving input from the user 302 via a user input device, and process the data payloads of network responses to the network requests (e.g., HTTPS responses) that are received over the data network(s) from the note system 310. In some embodiments, the note application 324 is downloaded to the user computer 304 from the note system 310 or otherwise made available to the user 302 by an operator or service provider of the note system 310.

The computer-executable form of the note application 324 may vary depending on the type of the user computer 304. On a workspace computer 304A, the note application 324A may be a dedicated client or desktop application specifically designed to execute on the workspace computer 304A or a class of computers to which the workspace computer 304A belongs. For example, note application 324A may be designated to execute on a particular desktop operating system (e.g., 210) brand(s) or version(s) (e.g., MICROSOFT WINDOWS version 7 or greater). On a mobile computer 304B, the note application 324B may, in some instances, be a dedicated client or desktop application, like note application 324A, such as when mobile computer 304B is a laptop computer or other portable computing device that is a portable version of a workspace computer 304A. In other instances, such as when mobile computer 304B is a mobile phone or a tablet computer, note application 324B may be a dedicated mobile or tablet application specifically designed to execute on the mobile computer 304B or a class of computers to which the mobile computer 304B belongs. For example, note application 324B may be designed to execute on a particular mobile or tablet operating system (e.g., 210) brand(s) or version(s) (e.g., IOS or ANDROID). On a web computer 304C, the note application 324C may be implemented by instructions that are executed by a conventional web browser application that also executes on the web computer 304C. Such instructions may include one or more of hypertext markup language instructions (HTML), cascading style sheet instructions (CSS), JAVASCRIPT instructions, or other web browser-executable instructions that are compatible with the particular web browser application version on the web computer 304C.

The user computer 304, of whichever type 304A, 304B, or 304C, may establish one or more network communications channel(s) 318 with a dispatch server 312 of the note system 310. A network communication channel 318 may be stablished according to the transmission control protocol/internet protocol (TCP/IP) transport networking layer protocol or other suitable transport networking layer protocol. The note application 324, of whichever form 324A, 324B, or 324C, executing on the user computer 304 may communicate with application(s) (e.g., 202) executing on the dispatch server 312 over a network communication channel or channels 318 established between the user computer 304 and the dispatch server 312. Such application to application communication may occur according to the HTTP or HTTPS application networking layer protocols or other suitable application networking layer protocol.

Various software-implemented functions of the subject innovations are described herein as being performed by a combination of the user computer 304 and the note system 310. However, the exact division of implementation of these functions between the user computer 304 and the note system 310 may vary from function to function and according to the requirements of the particular implementation at hand. In some cases, a function may be implemented entirely by the user computer 304. For example, the note application 324 may implement the function based on data received from the note system 310. In some cases, a function may be implemented entirely by the note system 310. For example, the note system 310 my implement the function based on data received from the user computer 304. Thus, unless expressly stated otherwise or apparent to one skilled in the art in light of this disclosure, it should not be assumed that the implementation of a given software-implemented function of the subject innovations is limited to a particular computer or computer system or computing environment.

The dispatch server 312 functions as a gateway to the note system 310 for user computers 304 and by extension users 302. The dispatch server 312 handles business logic, security and policy controls and responds to user requests from users 302 by way of their user computers 304. A user request, and a response thereto, may be sent over a network communications channel 318 established between the user computer 304 and the dispatch server 312 in the form of application networking layer protocol request(s) and response(s), as discussed above. Multiple dispatch servers 312 may be clustered together to provide better responsiveness to user requests when there are a high number of concurrent users 302 of the note system 310 (e.g., fifty or more).

The dispatch server 312 connects to a connected entity graph database system 314 (or just "graph database system 314" for brevity) and a connected entity graph search system 316 (or just "graph search system 316" for brevity). Graph database system 314 stores and provides access to data representing the entities, including electronic notes, and relationships between the entities that form the connected entity graph. An entity-centric data model for representing the entities, including electronic notes, and relationships there between of the connected entity graph is described below. Entity database system 314 may also store and provide access to administrator defined access controls on the entities and relationships in the graph. Such access controls may constrain what actions (e.g., discover, view, edit, delete, etc.) a given user 302 can take on a given entity or a given relationship. Entity database system 314 may also store a data type ontology. The data type ontology defines the types of entities, the types of entity properties, and the types of relationships that are allowed in the connected entity graph.

The graph database system 314, in some embodiments, provides a transactional application programming interface (API) to the dispatch server 312 for reading and writing entities and relationships of the connected entity graph from and to an underlying database system in the context of transactions. The underlying database system in some embodiments is a distributed non-relational key-value data store system such as the APACHE CASSANDRA database system or the APACHE HBASE database system. In other embodiments, the underlying database system is a conventional relational database management system (RDBMS) such as, for example, an ORACLE RDBMS. The transactional API in some embodiments is as described in related U.S. patent application Ser. No. 13/224,500, "Multi-Row Transactions," filed Sep. 2, 2011, the entire contents of which is hereby incorporated by reference. In other embodiments, the transactional API is provided by the underlying database system or an extension or interface thereto.

Irrespective of whether the underlying database system is a distributed non-relational key-value data store system or an RDBMS, the dispatch server 312 may interact with the transactional API of the graph database system 314 via a network communications channel 320 (e.g., a TCP/IP connection) that transits one or more data networks. Such interaction in some embodiments occurs in accordance with Java database connectivity (JDBC), Open database connectivity (ODBC), or other conventional technology allowing a client to access a database management system over a data network.

Graph search system 314 indexes the entities of the connected entity graph stored in the graph database system 312. Such indexing is done to facilitate searches of the connected entity graph via the visual search around feature. In some embodiments, the graph search system 314 benefits from clustered search partitioning in which the index of the entities is divided into multiple index shards and the shards are distributed over multiples server computers. In this configuration, a search query against the connected entity graph is routed by the dispatch server 312 to a server computer containing an index shard capable of answering the search query.

The dispatch server 312 may interact with the graph search system 316 via a network communications channel 322 (e.g., a TCP/IP connection) that transits one or more data networks. Such interaction may occur in accordance with the HTTP or HTTPS application layer networking protocol or other suitable application layer networking protocol.

The above-described networked computing environment is presented for purposes of illustrating an example computing environment in which the subject innovations may be employed. For purposes of discussion, the following description will present examples in which it will be assumed that there exists one or more "servers" (e.g., dispatch server(s) 312, graph database system server(s) 314, graph search system server(s) 316, etc.) that communicates with one or more "clients" (e.g., user computer 304). The subject innovations, however, are not limited to any particular environment. In particular, a client/server distinction is not necessary to the subject innovations, but is used to provide a framework for discussion. Instead, the subject innovations may be implemented in any type of system architecture or processing environment capable of supporting the methodologies of the subject innovations presented in detail below.

Connected Entity Graph Data Model

Data representing the entities and relationships there between of the connected entity graph may be represented in a computer (e.g., user computer 304, dispatch server 312, graph database system 314, or graph search system 316) according to an entity-centric data model. Data conforming to the entity-centric data model may be stored in a computer memory or computer storage device according to a variety of different data formats such as, for example, rows, records, or key-values of a database table or as data structure objects in memory. Additionally or alternatively, the data may be stored or transmitted in a human and machine readable data format such as, for example, Javascript object notation (JSON), eXtensible Markup Language (XML), or the like.

Figure 4:
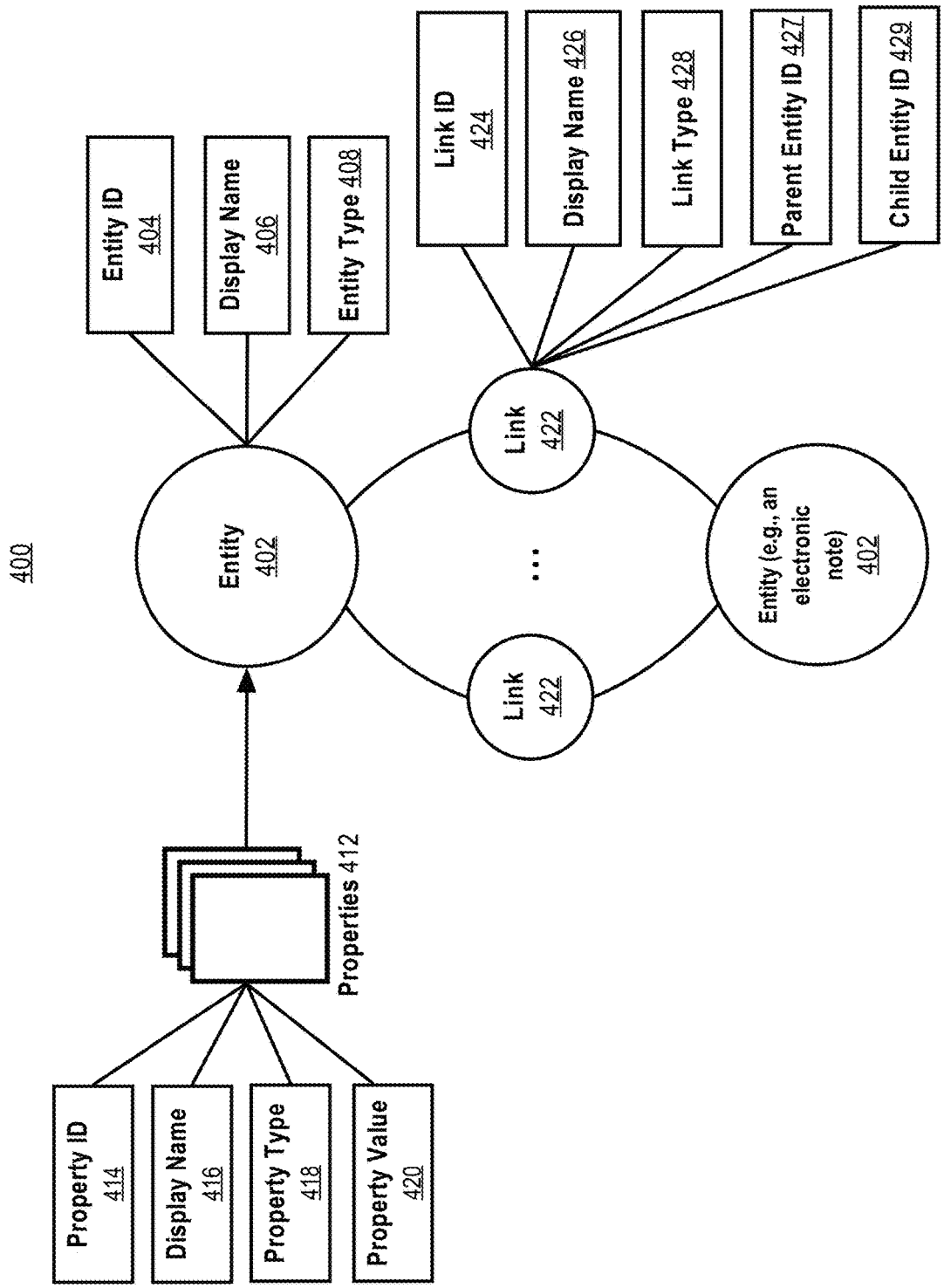
FIG. 4 depicts an entity-centric data model for data modeling a connected entity graph in a database system according to some embodiments of the subject innovations.

FIG. 4 depicts the entity-centric data model 400 according to an embodiment of the subject innovations. The model 400 includes entities 402, links 422, and properties 412.

Entities

An entity 402 can represent a person, place, thing, or other noun. An entity 402 can also represent an event or an electronic note. An entity 402 can have, but is not limited to, an entity identifier 404, a display name 406, and an entity type 408. The entity identifier 404 may uniquely identify the entity 402 (e.g., within note system 310). The entity identifier 404 may be represented by a computer as character string data or number data, for example.

The display name 406 may contain text data for display to a user (e.g., 302) when the entity 402 is represented in a graphical user interface (e.g., 215) at the user's computer (e.g., 304). For example, the display name 406 of an electronic note entity 402 may have a display name of "Bio notes", "Feedback notes", "Jan meeting notes", "Feedback from project manager", "Status notes", "Feedback observations", "My meeting notes", etc.

The entity type 408 may contain data representing the type of the entity 402. The entity type 408 may be defined according to the data type ontology. The data type ontology definition may be stored in a database such as, for example, the graph database system 314.

The data type ontology may define base entity types. In some embodiments, the base entity types include, but are not limited to, an Object entity type 408, an Event entity type 408, and an Electronic Note entity type 408. The base entity types may be represented in a computer as a character string such as, for example, a uniform resource name (URN) or uniform resource identifier (URI).

The data type ontology may also define sub-entity types of the base entity types. For example, possible sub-entity types of the Object entity type 408 might include, for example, a Person entity type 408, a Place entity type 408, an Organization entity type 408, etc. As another example, possible sub-entity types of the Electronic Note entity type 408 might include, for example, a School Note entity type 408, a Work Note entity type 408, a Personal Note entity type 408, etc. More generally, the sub-entity types of the base entity types can be user defined in the data type ontology according to the requirements of the particular implementation at hand.

Further, sub-entity types may be further sub-typed in the data type ontology thereby forming an entity type hierarchy within the data type ontology. For example, a Biology Note entity type 408 may be a sub-entity type of a School Note entity type 408 which in turn is a sub-entity type of the Electronic Note entity type 408. Thus, in this example, an entity 402 that is the Biology Note entity type 408 is also the School Note entity type 408 and the Electronic Note entity type 408.

In this description, reference is made to an entity 402 of a specified type 408 in the form of <entity type> entity 402 where <entity type> is the specified entity type 408. For example, reference to Electronic Note entity 402 refers to an entity 402 that is the Electronic Note entity type 408. The entity 402 may also be one or more other entity types 408 that are sub-entity types 408 of the base Electronic Note entity type 408, depending on the configuration of the data type ontology and if any such sub-entity types are assigned to the entity 402. For example, an Electronic Note entity 402 may not be assigned the School Note entity type 408 or any sub-entity type 408 thereof (e.g., the Biology Note entity type 408) if the Electronic Note entity 402 is not a school note, even though the data type ontology may define the School Note entity 408 are a valid sub-entity type of the Electronic Note entity type 408.

Properties

An entity 402 can have one or more properties 412. A property 412 is a text attribute of an entity 402 such as the text content of an electronic note, a person's name, or bank's address. The value 420 of the property 412 may contain the text attribute of the entity 402.

Like an entity 402, a property 412 may also have a unique identifier 414, a display name 416, and a type 418 defined according to the data type ontology. Like entity types 408, property types 418 may also be hierarchical as defined in the data type ontology. The data type ontology may also define which types 418 of properties 412 can be associated with which types 408 of entities 402. For example, the data type ontology might define a Text Content property type 418. The data type ontology may further defined that the Electronic Note entity type 408 can have one property 412 of the Text Content property type 418.

In this description, reference is made to a property 412 of a specified property type 418 of the form of <property type> property 412 where <property type> is the specified property type 418. For example, reference to Text Content property 412 refers to a property 412 that is the Text Content property type 418.

Links

A link 422 is a logical connection or relationship between two entities 402, such as a relationship between two Person entities 402 or a relationship between a Project entity 402 and an Electronic Note 402 entity. For example, a Person entity 402 might have an Appears In link 422 with an Electronic Note 402 entity, or an Electronic Note entity 402 might have a Followed Up By link 422 with another Electronic Note 402 entity, or a Person entity 402 might have an Attendee link 422 with a Meeting entity 402. When two entities 402 are connected in a connected entity graph by a link 422 between the two entities 402, the connection is also referred to herein as a "basic" connection.

Two entities 402 can also be connected by another "intermediary" entity 402 such as, for example, an Event entity 402. For example, a Person entity 402 might be connected with an Electronic Note entity 402 by a Steering Meeting entity 402. According to the data type ontology, the Steering Meeting entity type 408 might be a sub-type of a Meeting entity type 408 which in turn is a sub-type of the Event entity type 408.

When two entities 402 are connected by an intermediary entity 402, each of the two entities 402 have at least one link 422 with the intermediary entity 402. For example, the Person entity 402 might have an Attendee link 422 with the Steering Meeting entity 402 and the Electronic Note entity 402 might have a Taken At link 422 with the Steering Meeting entity 402.

When two entities 402 are connected in the connected entity graph by an intermediary entity 402, the connection is also referred to herein as a "complex" connection. A complex connection involves at least two links 422, one link 422 between one of the two entities 402 and the intermediary entity 402 and another link 422 between the other of the two entities 402 and the intermediary entity 402.

A link 422 may be directional. In particular, a link 422 may represent a connection or relationship from a "parent" entity 402 to a "child" entity 402 where the parent entity 402 is away from the direction of the link 422 and the child entity 402 is in the direction of the link 422. For example, the parent entity 402 of an Appears In link 422 might be a Person entity 402 and the child entity 402 of the link 422 an Electronic Note entity 402. To represent the directionality of a link 422, a link 422 may have a parent entity identifier 427 identifying the parent entity 402 of the link 422 by its entity identifier 404 and a child entity identifier 429 identifying the child entity 402 of the link 422 by its entity identifier 404.

Like an entity 402, a link 422 may also have a unique identifier 424, a display name 426, and a type 428 defined according to the data type ontology. Like entity types 408 and property types 418, link types 428 may also be hierarchical as defined in the data type ontology. The data type ontology may also define which link types 428 can be used to establish connections or relationships with which types 408 of entities 402. For example, the data type ontology might define an Appears In link type 428 and that an entity 402 of the Object entity type 408 can be a parent entity 402 of and that an entity 402 of the Electronic Note entity type 408 can be a child entity of.

In this description, reference is made to a link 422 of a specified type 428 of the form of <link type> link 422 where <link type> is the specified link type 428. For example, reference to Appears In link 422 refers to a link 422 that is the Appears In link type 428.

In the above description of the entity-centric data model 400, reference is made to sub-types as defined in the data type ontology. It should be understood that a sub-type defined in the data type ontology necessarily has one or more super types. For example, the data type ontology might define a Biology Note entity type 408 that is a sub-type of a School Note entity type 408 that, in turn, is a sub-type of the Electronic Note entity type 408. In this case, the School Note and Electronic Note entity types 408 are super types of the Biology Note entity type 408 and the Electronic Note entity type 408 is a super type of the School Note entity type 408.

With the above entity-centric data model 400 in mind, some examples of a connected entity graph that are modeled according to the entity-centric data model 400 will now be provided.

Connected Entity Graph Examples

Figure 5A:
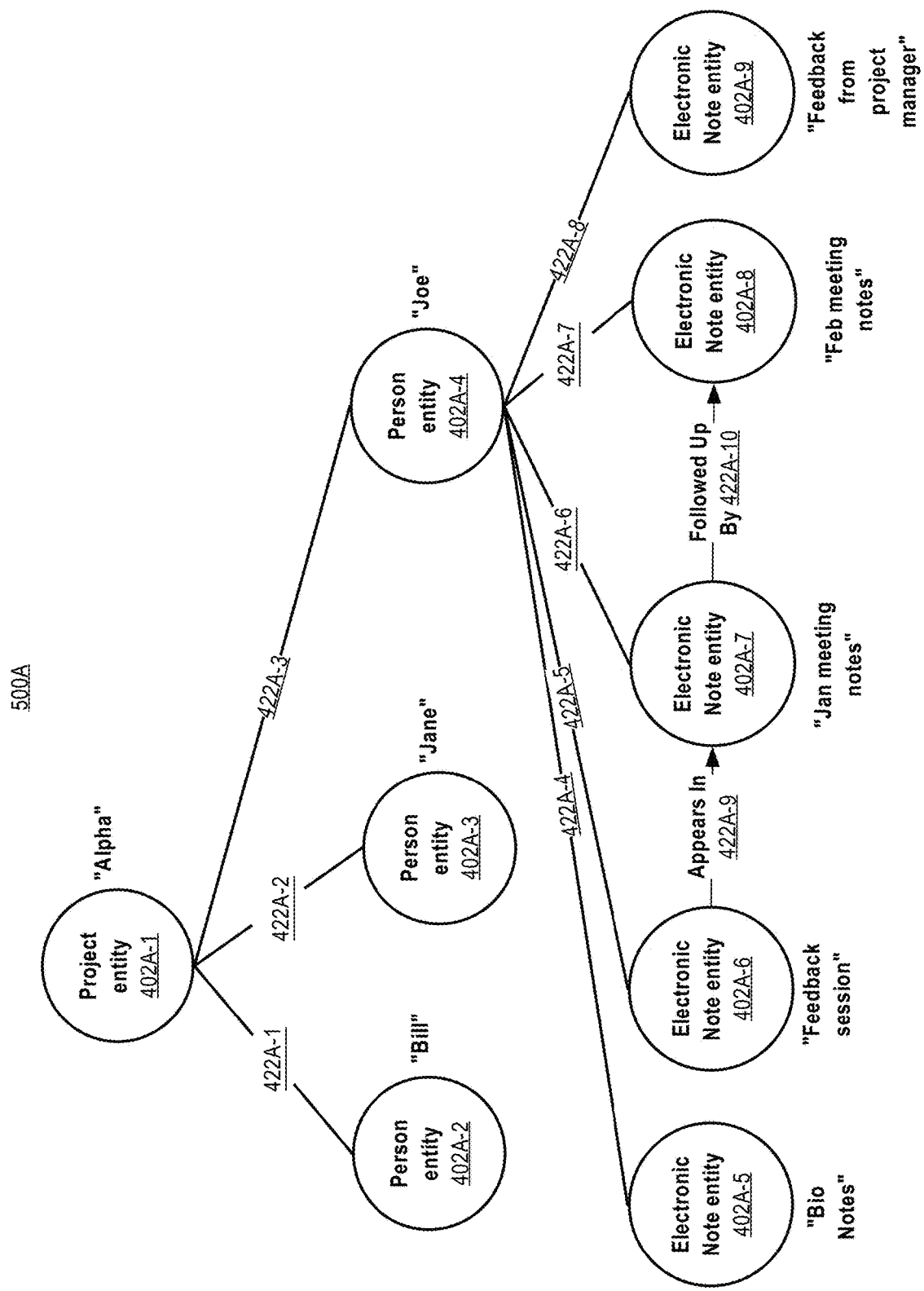
FIGS. 5A-5C provide example connected entity graphs modeled according to the entity-centric data model.
Figure 5B:
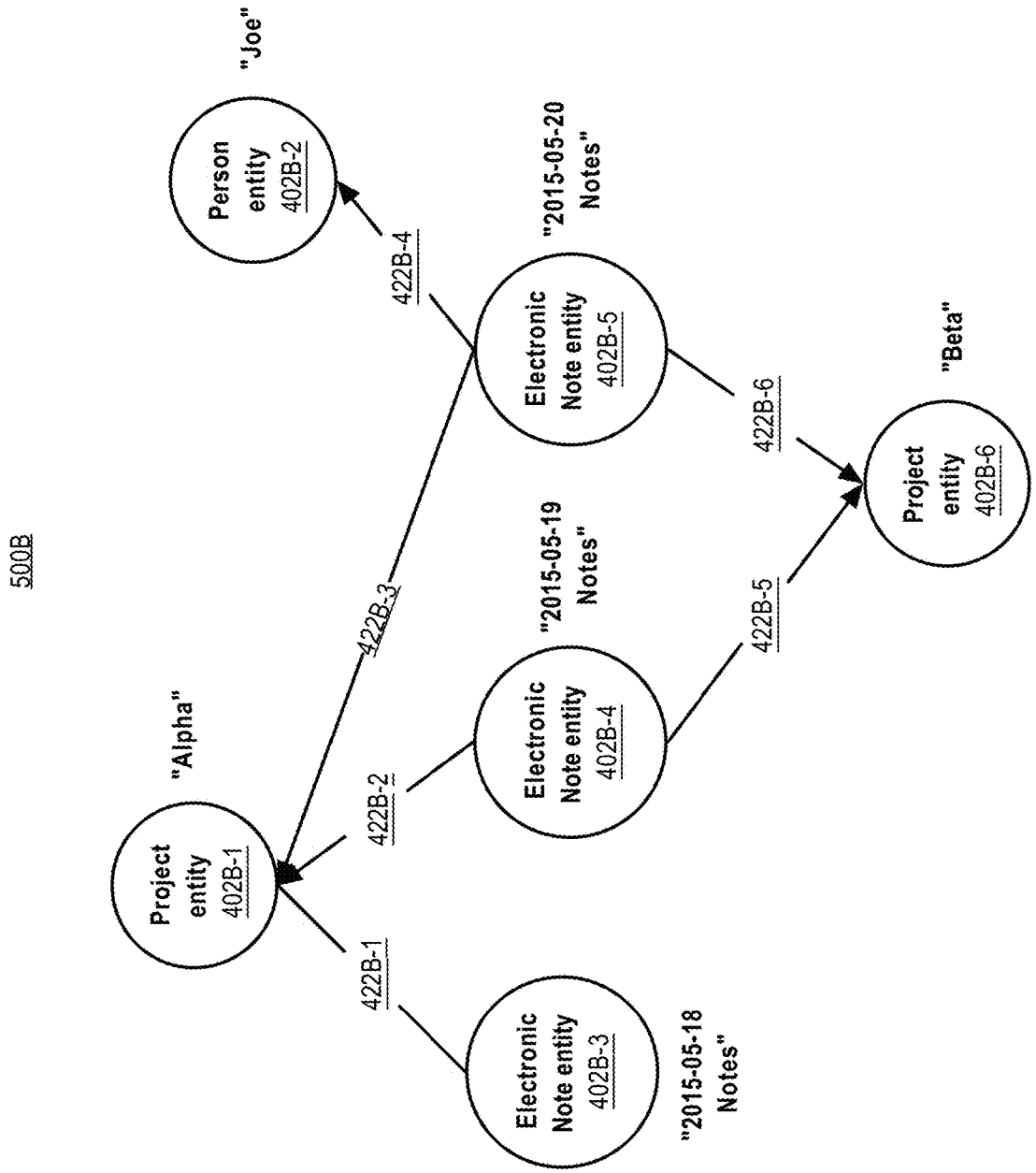
Figure 5C:
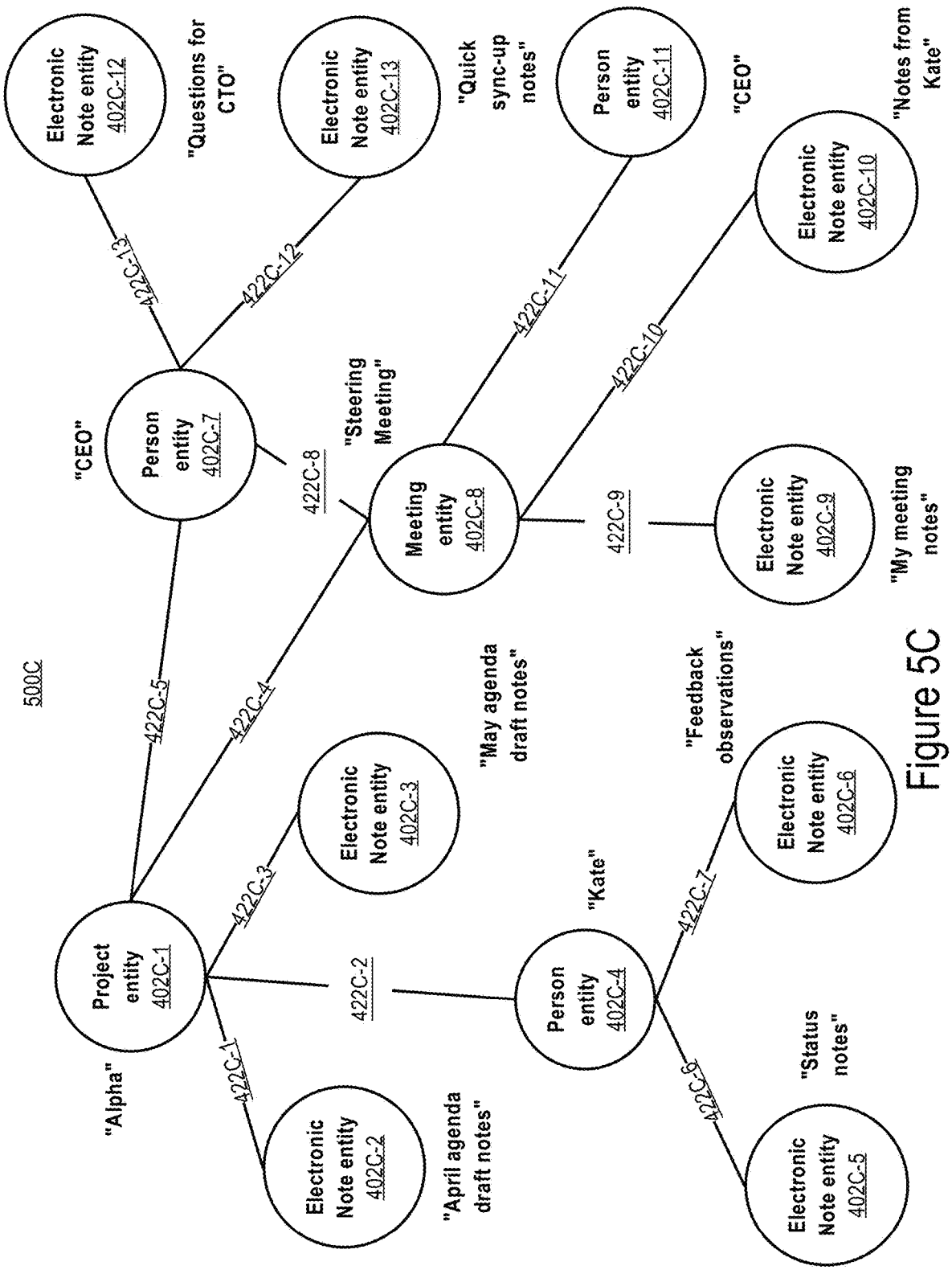

FIGS. 5A, 5B, and 5C provide three examples of a connected entity graph modeled according to the entity-centric data model. In the three examples, example display names 406 of entities 402 are presented in double-quotes next to circles representing the entities 402.

Turning first to FIG. 5A, it provides an example of a connected entity graph 500A modeled according to the entity-centric data model 400. In the graph 500A, the "Alpha" Project entity 402A-1 is linked with Person entities "Bill" 402A-2, "Jane" 402A-3, and "Joe" 402A-4 by links 422A-1, 422A-2, and 422A-3, respectively. The "Joe" Person entity 402A-4 is linked with Electronic Note entities 402A-5, 402A-6, 402A-7, 402A-8, and 402A-9 by links 422A-4, 422A-5, 422A-6, 422A-7, and 422A-8, respectively. The "Feedback session" Electronic Note entity 402A-6 has an Appears In link 422A-9 to the "Jan meeting notes" Electronic Note entity 402A-7 and the "Jan meeting notes" Electronic Note entity 402A-7 has a Followed Up By link 422A-10 to the "Feb meeting notes" Electronic Note entity 402A-8.

Graph 500A illustrates a useful aspect of the subject innovations. In particular, graph 500A illustrates that Electronic Note entities 402 in the connected entity graph are not necessarily static. For example, the "Feedback from project manager" Electronic Note entity 402A-9 may be a running note that includes multiple text entries over a period of time. For example, a Text Content property 412 of the Electronic Note entity 402A-9 can be modified by a user (e.g., 302) at a first time with first text provided by the user and then modified again by the user at a later second time with second text provided by the user. Prior to the second time, the value 420 of the Text Content property 412 may contain the first text. After the second time, the value 420 of the Text Content property 412 may contain both the first text and the second text. Graph 500A also illustrates that useful aspect that an Electronic Note entity 402 can link 422 to another Electronic Note entity 402. For example, graph 500A represents that "Jan meeting notes" is followed up by "Feb meeting notes".

Turning next to FIG. 5B, it provides a second example of a connected entity graph 500B modeled according to the entity-centric data model 400. In the graph 500B, the "Alpha" Project entity 402B-1 is linked with Electronic Note entities 402B-3, 402B-4 and 402B-5 by links 422B-1, 422B-2, and 422B-3, respectively. The "Beta" Project entity 402B-6 is linked with Electronic Note entities 402B-4 and 402B-5 by links 422B-5 and 422B-6, respectively. The "Joe" Person entity 402B-2 is linked with Electronic Note entity 402B-5 by link 422B-4.

Graph 500B illustrates another useful aspect of the subject innovations. In particular, an Electronic Note entity 402 is not limited to being linked 422 with only one other entity 402. For example, graph 500B may represent that "2015-05-20 notes" were taken by "Joe" and belongs to both projects "Alpha" and "Beta".

While two entities 402 can be connected in a connected entity graph by a single link 422, two entities 402 can be connected my multiple links 422 as well. For example, link 422B-5 may represent that the 2015-05-19 notes belongs to the Beta project and another link 422 (not shown) from Project entity 402B-6 to Electronic Note entity 402B-4 might represent that the Beta project has or is associated with the 2015-05-19 notes. Thus, two entities 402 can be connected in a connected entity graph by multiple links 422. Further, all of the multiple links 422 that connect the two entities 402 may not be symmetrical (i.e., can be of different link types 428). Further still, all of the multiple links 422 that connect the two entities 402 may not be in the same direction (i.e., can be bi-directional).

Turning now to FIG. 5C, it provides a third example of a connected entity graph 500C modeled according to the entity-centric data model 400. Graph 500C illustrates yet another useful aspect of the subject innovations. In particular, the connected entity graph approach allows modeling of real-word objects such as persons, places, things, and events and their associations with multiple distinct electronic notes. For example, the connected entity graph and entity-centric data model approach is flexible enough to allow linking an Electronic Note entity 402 with a Meeting entity 402 or a Person entity 402. For example, in graph 500C, the "Status notes" Electronic Note entity 402C-5 is linked 422C-6 with the "Kate" Person entity 402C-4. In contrast, the "My meeting notes" Electronic Note entity 402C-9 is linked 422C-9 with the "Steering Meeting" Meeting entity 402C-8.

The connected entity graphs 500A, 500B, and 500C of FIGS. 5A, 5B, and 5C, respectively, are just some examples of possible connected entity graphs that may be managed by an electronic note management system (e.g., 310) of the subject innovations. Other connected entity graphs may include more, fewer, or different entities and links, including different types of entities and different types of links.

Connected Entity Graph Visual Explorer

According to some embodiments, an application (e.g., 324), a dispatch server (e.g., 312), a database system (e.g., 314), and a search system (e.g., 316) interoperate to provide a connected entity graph visual explorer feature to a user (e.g., 302) of a user computer (e.g., 304).

The connected entity graph visual explorer allows the user through a graphical user interface (e.g., 215) presented at the user computer to analyze vast and complex networks of electronic notes including more easily visualizing and organizing information at hand while avoiding a cluttered and chaotic graphical user interface workspace.

According to some embodiments, the connected entity graph visual explorer is a visual computer interface for exploring relationships, developing networks, and uncovering connections involving electronic notes. According to embodiments, the connected entity graph visual explorer feature provides visual organizing capabilities to the user such as altering layouts, merging entities into groups, adding electronic notes, and associating electronic notes with other entities. In this way, the connected entity graph visual explorer provides the user with a multitude of features for customizing the display to best suit their needs and maximize efficiency while at the same time serving as an access point for network exploration and pattern discovery features such as the connected entity graph visual search around feature discussed below. The connected entity graph visual explorer provides the user a way to visualize not just what the user already knows but also provides a dynamic interface that allows the user to both organize and expand upon the user's existing knowledge.

According to some embodiments, the connected entity graph visual explorer provides at least three different primary views of a connected entity graph in a graphical user interface. Each of the three different primary views is selectable by the user. Which of the three different primary views is selected determines how the connected entity graph is presented in the graphical user interface. In particular, the selected primary view determines which types of entities of the connected entity graph are represented as nodes in the visual representation of the connected entity graph.

According to some embodiments, the three primary views include a note-to-note view, a note-to-object view, and a note-to-event view. In the note-note view, first degree or first and second degree relationships between Electronic Note entities 402 in the connected entity graph are primarily represented. In the note-object view, first degree or first and second degree relationships between Electronic Note entities 402 and Object entities 402 in the connected entity graph are primarily represented. In the note-event view, first degree or first and second degree relationships between Electronic Note entities and Event entities 402 in the connected entity graph are primarily represented.

Each of the three different views also has at least two sub-views selectable by the user. The sub-view selected determines whether only first degree or both first and second degree relationships are represented in the graphical user interface.

Visual Representation of a Connected Entity Graph

According to some embodiments, the visual representation of a connected entity graph in the graphical user interface at the user computer includes icons (also referred to herein as "nodes") and edges connecting the nodes. The nodes represent all or a selected subset of the entities 402 of the connected entity graph. An edge between two of the nodes represents one or more connections (e.g., all connections) between the two entities 402 represented by the nodes connected by the edge.

Each of the one or more connections between two entities 402 represented by an edge may be a basic connection or a complex connection between the two entities 402. A basic connection between two entities 402 established by a link 422 between the two entities 402 in the connected entity graph. A complex connection can be an N-degree connection between the two entities 402. The number of intermediary entities 402 that form the complex connection between the two entities 402 is the degree of the complex connection. For example, if a complex connection between the two entities 402 involves a single intermediary entity 402, then the complex connection is a first degree complex connection. If, however, the complex connection between the two entities 402 involves two intermediary entities 402, the complex connection is a second degree complex connection, and so forth. In addition to a complex connection between two entities 402 established by a single intermediary entity 402, a basic connection between two entities 402 is also considered to be a first degree connection even though the basic connection is not established by an intermediary entities 402 between the two entities 402. Thus, a first degree connection between two entities 402 may encompass either a) a basic connection between the two entities 402 established by a link 422 between the two entities 402 in the connected entity graph or b) a complex connection between the two entities 402 established by a single intermediary entity 402 between the two entities 402 in the connected entity graph. It should be noted that when a first degree complex connection exists between two entities 402 there are at least two constituent basic connections, one established by a link 422 between one of the two entities 402 and the intermediary entity 402 of the complex connection and another established by a link 422 between the other of the two entities 402 and the intermediary entity 402.

While in some embodiments a visual representation of a connected entity graph represents all entities 402 of a connected entity graph, a visual representation can represent less than all of the entities 402 of a connected entity graph in other embodiments. For example, a visual representation of a connected entity graph may represent a selected subset of all of the entities 402 of the connected entity graph that are selected by a user such as, for example, by performing a visual search around query as described below.

According to some embodiments, when an edge represents a basic connection, the display name 426 of the link 422 that establishes the basic connection is displayed in the graphical user interface. For example, the display name 426 could be displayed in the graphical user interface near, partially overlapping, or straddling the edge. In some embodiments, the display name 426 is displayed only when the user directs some input to the edge. For example, the display name 426 may be displayed only when the user clicks on or touches (e.g., with a touch gesture directed to a touch-sensitive surface) the edge or hovers a pointing device cursor over the edge. If the edge represents multiple basic connections, then multiple display names 426 may be displayed. For example, one display name 426 may be displayed for each of the multiple basic connections.

According to some embodiments, when an edge represents a complex connection, a complex connection indicator overlays or straddles the edge in the visual representation of the connected entity graph. The complex connection indicator may indicate the type 408 of intermediary entity 402 that connects the two entities 402 connected by the edge. For example, a complex connection indicator may display the letter 'P' to indicate that two entities 402 are connected by an intermediary Project entity 402 in the connected entity graph. The complex connection indicator can take other visual forms to indicate the type 408 of the intermediary entity 402. For example, the complex connection indicator could be a graphic, icon, or image that represents a project. If the edge represents multiple complex connections or represents a complex connection that is greater than the first degree, then multiple corresponding complex connection indicators may be displayed. For example, one complex connection indicator may be displayed for each intermediary entity 402 of the multiple complex connections.

According to some embodiments, the display name 406 of the intermediary entity 402 represented by a complex connection indicator is displayed in the graphical user interface. The display name 406 could be displayed near, partially overlapping, or within complex connection indicator. In some embodiments, the display name 406 is displayed only when the user directs some input to the complex connection indicator. For example, the display name 406 may be displayed only when the user clicks on, or activates with a touch gesture, the complex connection indicator or hovers a pointing device cursor over the complex connection indicator. If the edge represents multiple complex connections or represents a complex connection that is greater than the first degree, then multiple display names 406 may be displayed. For example, one display name 406 may be displayed for each intermediary entity 402 of the multiple complex connections.

Thus, an edge between two nodes of a visual representation can also represent multiple connections between the two entities 402 represented by the two nodes. For example, the edge can represent a basic connection and a complex connection between the two entities 402, multiple basic connections between the two entities 402, multiple complex connections between the two entities 402, or multiple basic connections and multiple complex connections between the two entities 402.

In the case where the edge represents at least multiple complex connections, multiple corresponding complex connection indicators may overlay or straddle the edge. Each of the multiple complex connection indicators may visually indicate the type of an intermediary entity 402 via which the two Electronic Note entities 402 are connected. According to some embodiments, if there is more than a threshold number of complex connection indicators to display with respect to the edge such that displaying each of them separately without overlapping each other would cause the display screen to be cluttered or otherwise visually unappealing, then the multiple complex connection indicators can be displayed at least partially overlapping each other so as to conserve display screen space. In addition or alternatively, a "group" connection indicator can be displayed in lieu of displaying multiple connection indicators. The display of the group connection indicator can be such that it visually indicates to the user that it represents multiple complex connections.

A complex connection indicator can take various different graphical user interface display formats and the subject innovations are not limited to any particular display format. For example, the connection indicator can be an icon or graphic that indicates the type 408 of the intermediary connecting entity 402 instead of geometric shape enclosing a letter indicating the type 408.

According to some embodiments, the display name 406 of an entity 402 represented by a node in the visual representation of a connected entity graph is presented next to the node in the graphical user interface. For example, the display name 406 could be displayed next to or at least partially overlapping the node.

According to some embodiments, the graphical representation of a node in the visual representation indicates the type 408 of the entity 402 represented by the node. For example, the type 408 may be indicated by a graphic, an icon, color, visual shape of the node, text or characters printed on or near the node. In some embodiments, the graphical representation of a node indicates the base type 408 of the entity 402 represented by the node which may be one of Electronic Note base type 408, Object base type 408, or Event base type 408. In these embodiments, a user viewing the visual representation can tell which nodes, if any, represent Object entities 402, which nodes, if any, represent Electronic Note entities 402, and which nodes, if any, represent Event entities 402.

According to some embodiments, the display name 406 of an entity 402 represented by a node in the visual representation of a connected entity graph is presented in response to the user (e.g., 302) directing input to the node. For example, the display name 406 could be displayed next to or at least partially overlapping the node in response to the user moving a pointing device cursor over the node or in response to the user clicking or double-clicking on the node using a pointing device or in response to the user directing a touch gesture (e.g., a tap or double-tap gesture) to the node.

According to some embodiments, the display name 406 of an intermediary connecting entity 402 represented by a complex connection indicator in the visual representation of a connected entity graph is presented next to the complex connection indicator in the graphical user interface. For example, the display name 406 could be displayed next to or at least partially overlapping the complex connection indicator.

According to some embodiments, the display name 406 of an intermediary connecting entity 402 represented by a complex connection indicator in the visual representation of a connected entity graph is presented in response to the user (e.g., 302) directing input to the complex connection indicator. For example, the display name 406 could be displayed next to or at least partially overlapping the complex connection indicator in response to the user moving a pointing device cursor over the complex connection indicator or in response to the user clicking or double-clicking on the complex connection indicator using a pointing device or in response to the user directing a touch gesture (e.g., a tap or double-tap gesture) to the complex connection indicator.

While in some embodiments nodes of a visual representation of a connected entity graph are displayed in a graphical user interface in a circular layout, nodes are displayed in other layouts in other embodiments. For example, the nodes could be displayed in a rectangular grid layout or in a concentric layout. In some embodiments, the layout of the nodes is selected by the user through user interface controls presented in the graphical user interface.

Electronic Note to Electronic Note First Degree Connections View Example

Figure 6A:
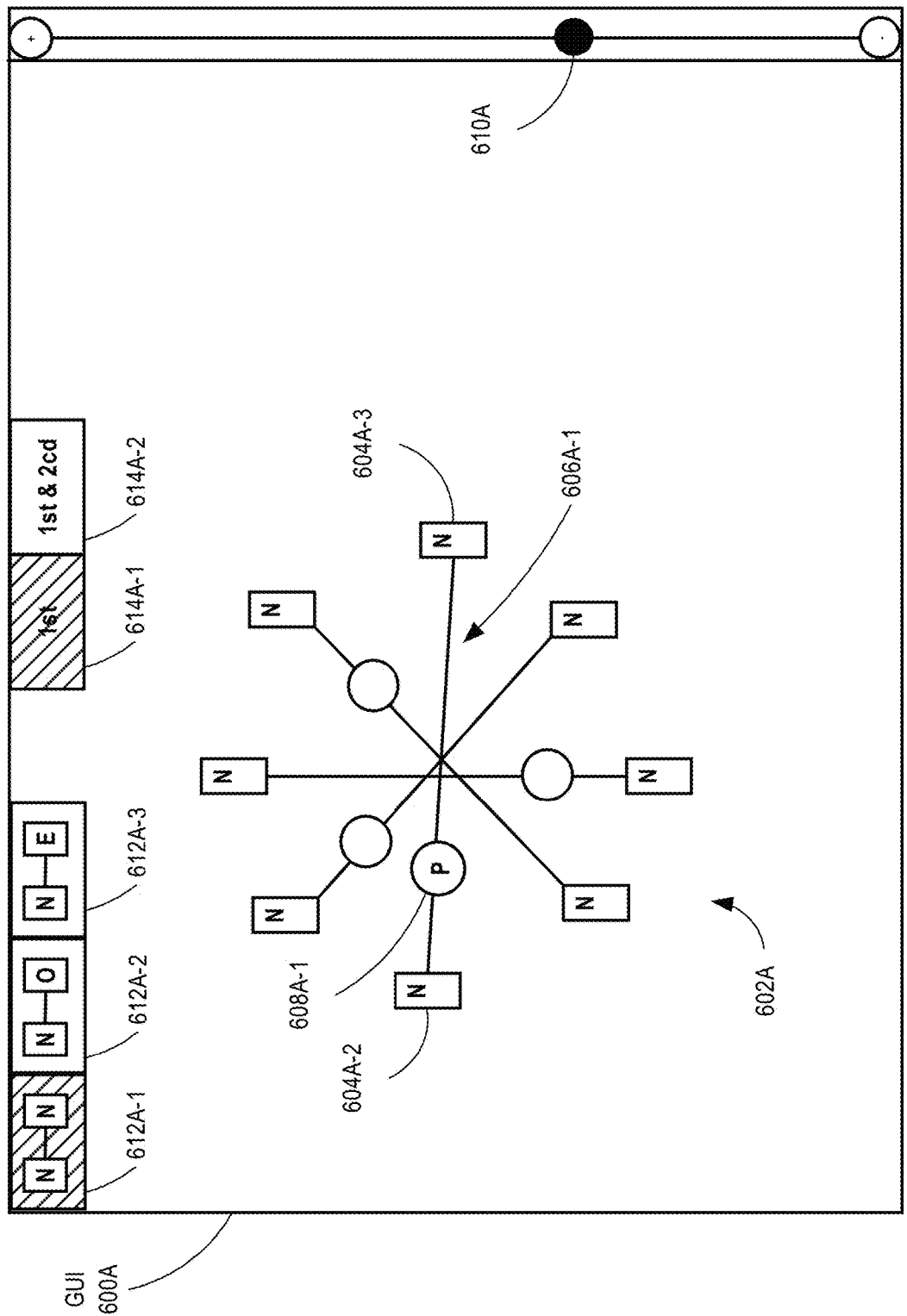
FIG. 6A illustrates a graphical user interface providing a note to note first degree connections view of the connected entity graph of FIG. 5C, according to some embodiments of the subject innovations.

FIG. 6A illustrates a graphical user interface (GUI) 600A providing an electronic note to electronic note first degree connections view of the connected entity graph 500 of FIG. 5C. In particular, the GUI 600A comprises a visual representation 602A of the first degree connections between the Electronic Note entities 402 of the connected entity graph 500C of FIG. 5C. The visual representation 602A comprises nodes (e.g., 604A-2, 604A-3) and edges (e.g., 606A-1) connecting the nodes. Each edge connects two nodes. The nodes include the letter 'N' to indicate that each of the nodes represent an Electronic Note entity 402 in the connected entity graph 500C. Other visual indicators may be used in other embodiments to indicate the type 408 of entity 402 that a node represents. For example, a node may have graphical appearance of a paper note or a piece of paper to indicate that the node represents an Electronic Note entity 402, as opposed to an Object entity 402, an Event entity 402, or some other type 408 of entity 402 that is not an Electronic Note entity 402.

The GUI 600A also includes primary view selection controls 612 and sub-view selection controls 614. Primary view selection controls 612 include note-note view selection controls 612A-1, note-object view selection controls 612A-2, and note-event view selection controls 612A-3. Sub-view selection controls 612 include first degree connections only sub-view selection controls 614A-1 and first and second degree connections sub-view selection controls 614A-2. In GUI 600A controls 612A-1 and 614A-1 are currently selected.

In this example, the controls 612 and 614 take the form of graphical user interface buttons. However, the controls 612 and 614 could take the form of other graphical user interface controls in other embodiments. For example, the various options of controls 612 and 614 could be selectable in a drop-down or pop-up menu, as just some examples of alternative graphical user interface controls.

In the example of GUI 600A, the user has currently selected note-note view controls 612A-1 and first degree connections only sub-view controls 614A-1. Accordingly, each of the nodes of visual representation 602A represents one of the Electronic Note entities 402C-2, 402C-3, 402C-5, 402C-6, 402C-9, 402C-10, 402C-12, and 4012C-13 of the connected entity graph 500C. For example, node 604A-2 might represent Electronic Note entity 402C-2 and node 604A-3 might represent Electronic Note entity 402C-3 of connected entity graph 500C.

Each edge of visual representation 602A represents a first degree connection between two Electronic Note entities 402 of connected entity graph 500C. For example, edge 606A-1 represents the complex connection between Electronic Note entity 402C-2 and Electronic Note entity 402C-3 via intermediary Project entity 402C-1 of connected entity graph 500C. A connection indicator 608A-1 is also displayed to indicate that Electronic Note entity 402C-2 and Electronic Note entity 402C-3 are connected by the intermediary Project entity 402C-1 in connected entity graph 500C.

The GUI 600A includes graphical user interface controls 610A for zooming the visual representation 602A in or out depending on the direction the controls 610A are moved. For example, moving the controls 610A along the slider toward the top of the GUI 600A could zoom in on the visual representation 602A with respect to a current point of focus. The current point of focus could be a currently selected edge or node, for example. In this case, moving the controls 610A along the slider toward the bottom of the GUI 600A would zoom out on the visual representation 602A with respect to the current point of focus.

In some embodiments, at a sufficiently close zoom level, the text content of Electronic Note entities 402 represented by nodes in a visual representation is readable in the graphical user interface. For example, at a particular zoom level some or all of the text content of an Electronic Note entity 402 may be displayed within the boundary of the node representing the Electronic Note entity 402. The text may be displayed in a certain font size (e.g., 12 point). The font size may depend on the zoom level. For example, higher zoom levels may correspond to larger font sizes with lower zoom levels corresponding to smaller font sizes.

In some embodiments, if some but not all of the text content of Electronic Note entity 402 is not displayed within the boundary of the corresponding node, then the node is displayed in the graphical user interface in such a way so as to indicate that there is more text content available. For example, the node may be displayed with more text available indicator. For example, the more text available indicator could be a small colored circle displayed within the boundary of the node with a plus '+' character symbol displayed within the colored circle. In some embodiments, when the user directs input to the more text available indicator, a pop-up window is displayed providing the entire text content of the Electronic Note entity 402 in the pop-up window. In addition or alternatively, the pop-up window may be displayed in response to the user directing input to the node itself as opposed to the more text available indicator, whether or not displayed. The pop-up window may also be scrollable (e.g., in the vertical direction) if all of the text content is not displayable within the boundaries of the pop-up window.

Concentric Layout

According to some embodiments, a concentric layout of the nodes of a visual representation of a connected entity graph is useful to the user to be able to visualize degrees of separation greater than the first degree of separation between entities 402 with respect to a selected entity 402. For example, according to an embodiment, the user (e.g. 302) may select a node in a visual representation of a connected entity graph and then activate user interface controls (e.g., a button) for displaying the nodes in the first and second connections sub-view of the currently selected primary view. In the concentric layout, the selected node becomes the center of a first circle. The nodes along the circumference of the first circle represent entities 402 within one degree of separation in the connected entity graph from the entity 402 corresponding to the selected node. Each next circle outside of the first circle represents entities 402 separated by two degrees of separation in the connected entity graph from the selected entity 402, and so forth. Thus, the concentric layout is useful for visualizing one or more degrees of separation between Electronic Note entities 402 and other entities 402.

Figure 6B:
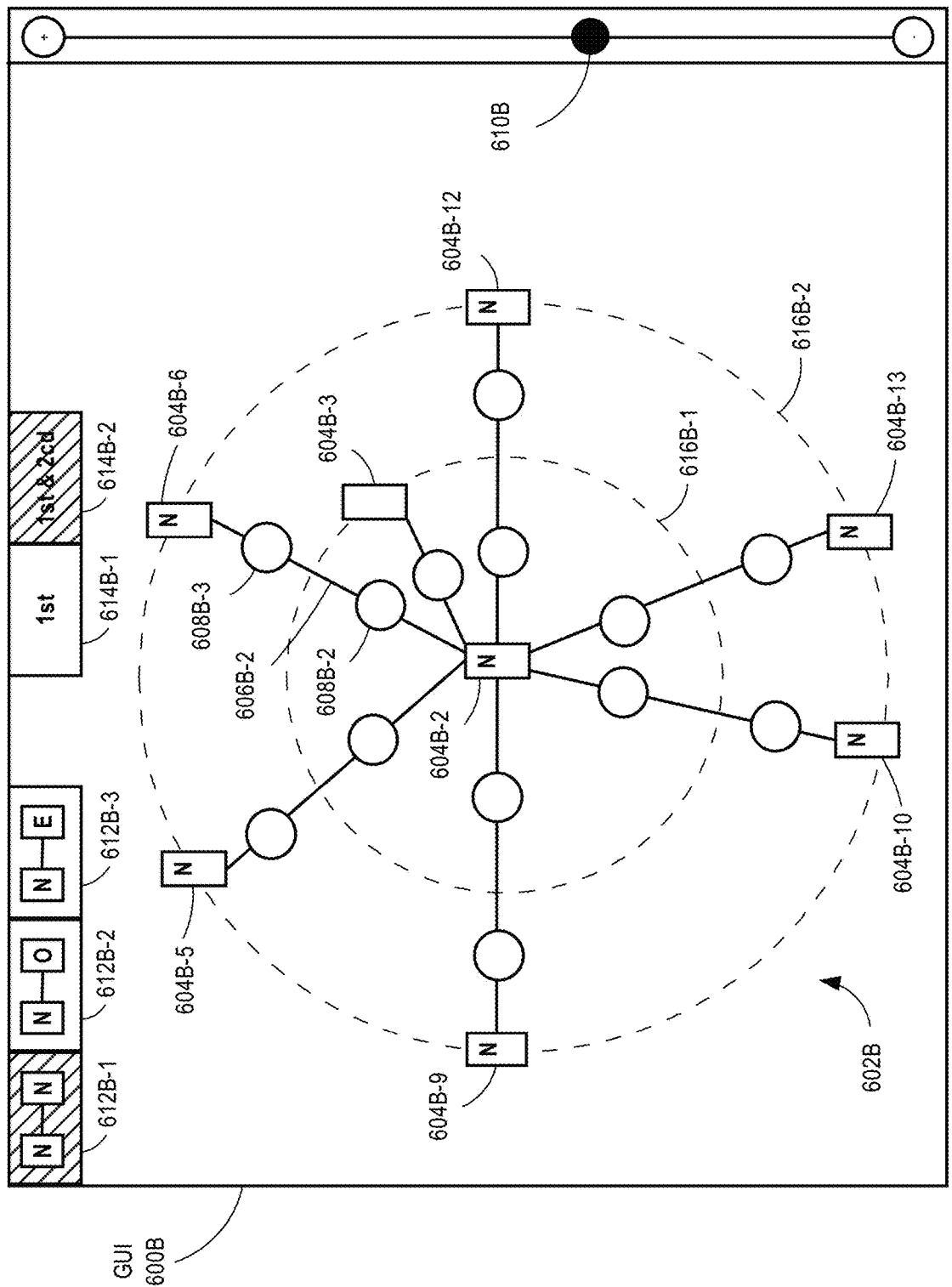
FIG. 6B illustrates a graphical user interface providing a note to note first and second degree connections view of the connected entity graph of FIG. 5C, according to some embodiments of the subject innovations.

Electronic Note to Electronic Note First and Second Degree Connections View Example For example, FIG. 6B illustrates GUI 600B displayed in response to the user selecting node 604A-2 and then selecting controls 614A-2 in GUI 600A without changing the primary view of the connected entity graph 500C from the note-note primary view.

GUI 600B provides an electronic note to electronic note first and second degree connections view of the connected entity graph 500C. In particular, GUI 600B includes visual representation 602B of connected entity graph 500C in a concentric layout and shows all first and second degree connections between a selected Electronic note entity 402 and other Electronic Note entities 402 in the connected entity graph 500C. In this example, node 604B-2 representing Electronic Note entity 402C-2 has been selected by the user to be the center node of the concentric layout. Accordingly, a first circle 616B-1 around node 604B-2 includes node 604B-3 representing Electronic Note entity 402C-3, which is the only Electronic Note entity 402 in connected entity graph 500C with which Electronic Note entity 402C-2 has a first degree relationship. Electronic Note entity 402C-2 has a second degree relationship in connected entity graph 500C with each of Electronic Note entities 402C-5, 402C-6, 402C-9, 402C-10, 402C-12, and 402C-13 represented in visual representation 602B by nodes 604B-5, 604B-6, 604B-9, 604B-10, 604B-12, and 604B-13, respectively. Each of those nodes are displayed in the second circle 616B-2 around the first circle 616B-1 to indicate that the Electronic Note entities 402 represented by these nodes have a second degree relationship with the selected Electronic Note entity 402C-2. In some embodiments, a visual representation of the concentric circles (e.g., 616B-1, 616B-2) is not displayed in the graphical user interface.

According to some embodiments, when two entities 402 are connected by a second degree connection in a connected entity graph, at least two complex connection indicators overlay the edge representing the second degree connection. For example, edge 606B-2 represents the second degree connection in connected entity graph 500C between Electronic Note entity 402C-2 and Electronic Note entity 402C-6 via Project entity 402C-1 and Person entity 402C-4. Accordingly, edge 606B-2 is overlaid with complex connection indicator 608B-2 representing the first degree connection in connected entity graph 500C between Electronic Note entity 402C-2 and Project entity 402C-1 and edge 606B-2 is also overlaid with complex connection indicator 608B-3 representing the first degree connection in connected entity graph 500C between Person entity 402C-4 and Electronic Note entity 402C-6.

GUI 600B also provides zoom controls 610B that operate like zoom controls 610B of GUI 600A.

Electronic Note to Object First Degree Connections View Example

Figure 7A:
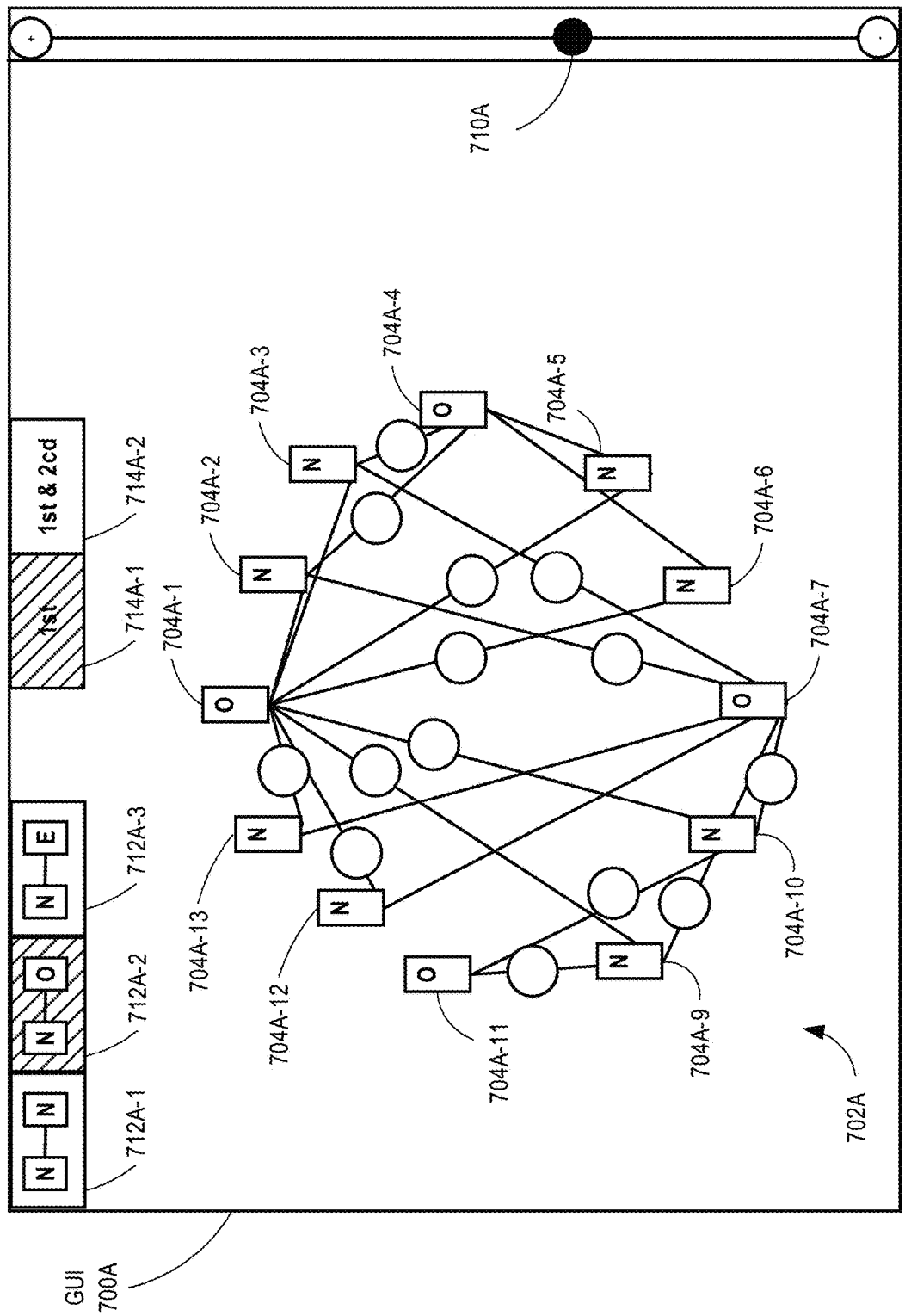
FIG. 7A illustrates a graphical user interface providing a note to object first degree connections view of the connected entity graph of FIG. 5C, according to some embodiments of the subject innovations.

Turning now to FIG. 7A, it illustrates a graphical user interface (GUI) 700A providing an electronic note to object first degree connections view of the connected entity graph 500C. In particular, the GUI 700A comprises a visual representation 702A of the first degree connections between the Electronic Note entities 402 and Object entities 402 in the connected entity graph 500C of FIG. 5C. GUI 700A may be displayed in response to the user selecting note-object view controls 612B-2 and first degree connections only controls 614B-1 in GUI 600B, for example.

Some nodes include the letter 'N' to indicate that each such node represents an Electronic Note entity 402 in the connected entity graph 500C. Some nodes include the letter 'O' to indicate that each such node represents an Object entity 402 in the connected entity graph 500C. Other visual indicators may be used in other embodiments to indicate the type 408 of entity 402 that a node represents. For example, a node may have the graphical appearance of a paper note or a piece of paper to indicate that the node represents an Electronic Note entity 402, as opposed to an Object entity 402, an Event entity 402, or some other type 408 of entity 402 that is not an Electronic Note entity 402. Another node may have the graphical appearance of a person, place, group, organization, or thing to indicate that the node represents an Object entity 402, as opposed to an Electronic Note entity 402, an Event entity 402, or some other type 408 of entity 402 that is not an Object entity 402.

In visual representation 702B, nodes 704A-2, 704A-3, 704A-5, 704A-6, 704A-9, 704A-10, 704A-12, and 704A-13 may represent Electronic Note entities 402C-2, 402C-3, 402C-5, 402C-6, 402C-9, 402C-10, 402C-12, and 402C-13, respectively. Nodes 704A-1, 704A-4, 704A-7, and 704A-11 may represent Object entities 402C-1, 402C-4, 402C-7, and 402C-11, respectively. Assuming Meeting entity type 408 is a sub-type of the Event entity type 408, then Meeting entity 408C-8 may not be represented by a node in the visual representation 702A because it is not an Electronic Note entity 402 or an Object entity 402.

GUI 700A also provides zoom controls 710A like those discussed above.

Electronic Note to Object First and Second Degree Connections View Examples

Figure 7B:
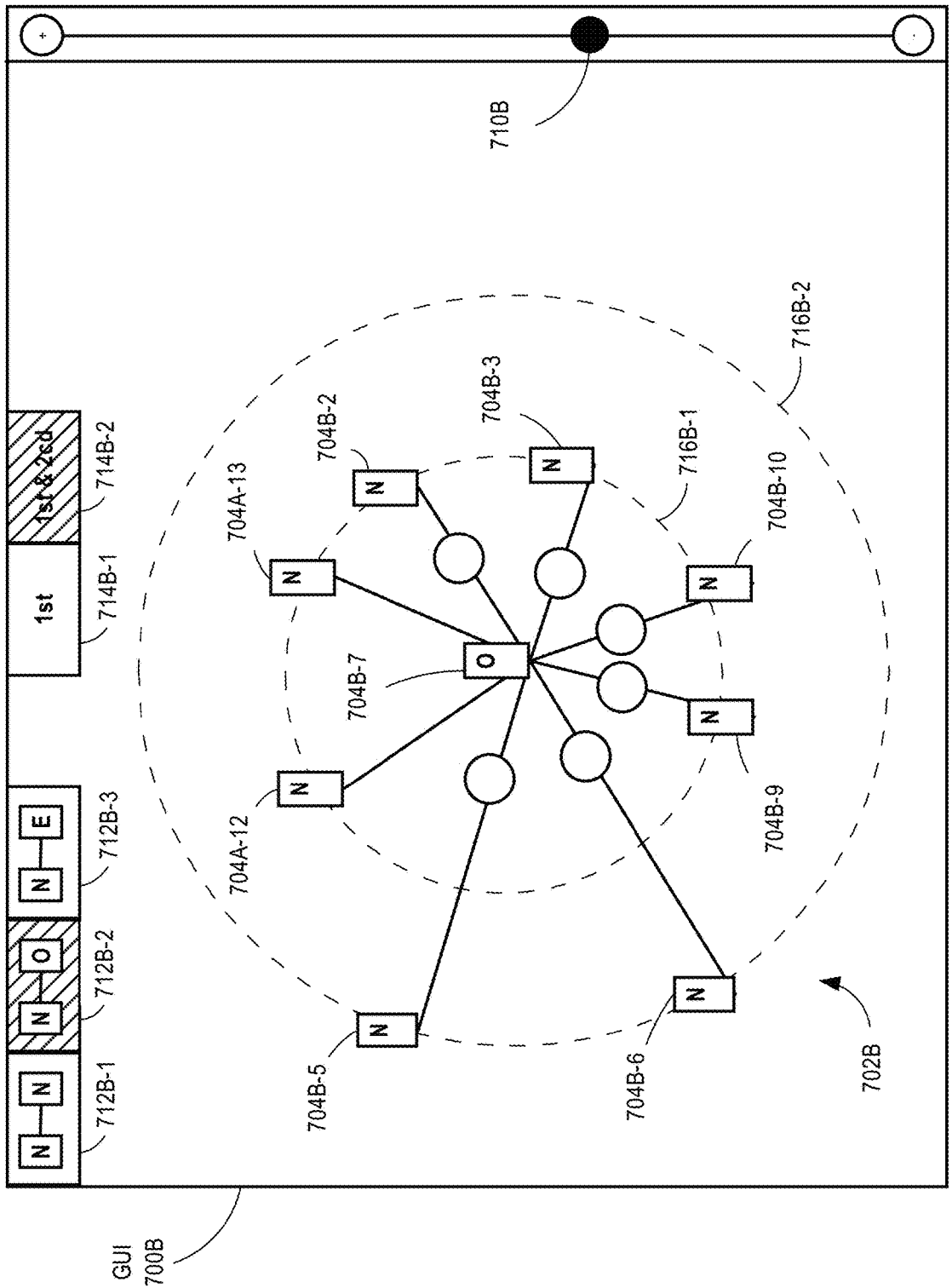
FIG. 7B illustrates a graphical user interface providing a note to object first and second degree connections view of the connected entity graph of FIG. 5C, according to some embodiments of the subject innovations.

FIG. 7B illustrates GUI 700B displayed in response to the user selecting node 704A-7 and then selecting controls 714A-2 in GUI 700A without changing the primary view of the connected entity graph 500C from the note-object primary view.

GUI 700B includes visual representation 702B of connected entity graph 500C in a concentric layout and shows all first and second degree connections between selected Object entity 402C-7 and Electronic Note entities 402 in the connected entity graph 500C. In this example, node 704B-7 representing Person entity 402C-7 has been selected by the user to be the center node of the concentric layout. Accordingly, a first circle 716B-1 around node 704B-7 includes nodes 704B-2, 704B-3, 704B-9, 704B-10, 704B-12, and 704B-13 representing Electronic Note entities 402B-2, 402B-3, 402B-9, 402B-10, 402B-12, and 402B-13, respectively. Person entity 402C-7 also has a second degree relationship in connected entity graph 500C with Electronic Note entities 402C-5 and 402C-6 as represented by nodes 704A-5 and 704A-6, respectively on the second circle 716B-2.

GUI 700B also provides zoom controls 710B like those discussed above.

Figure 7C:
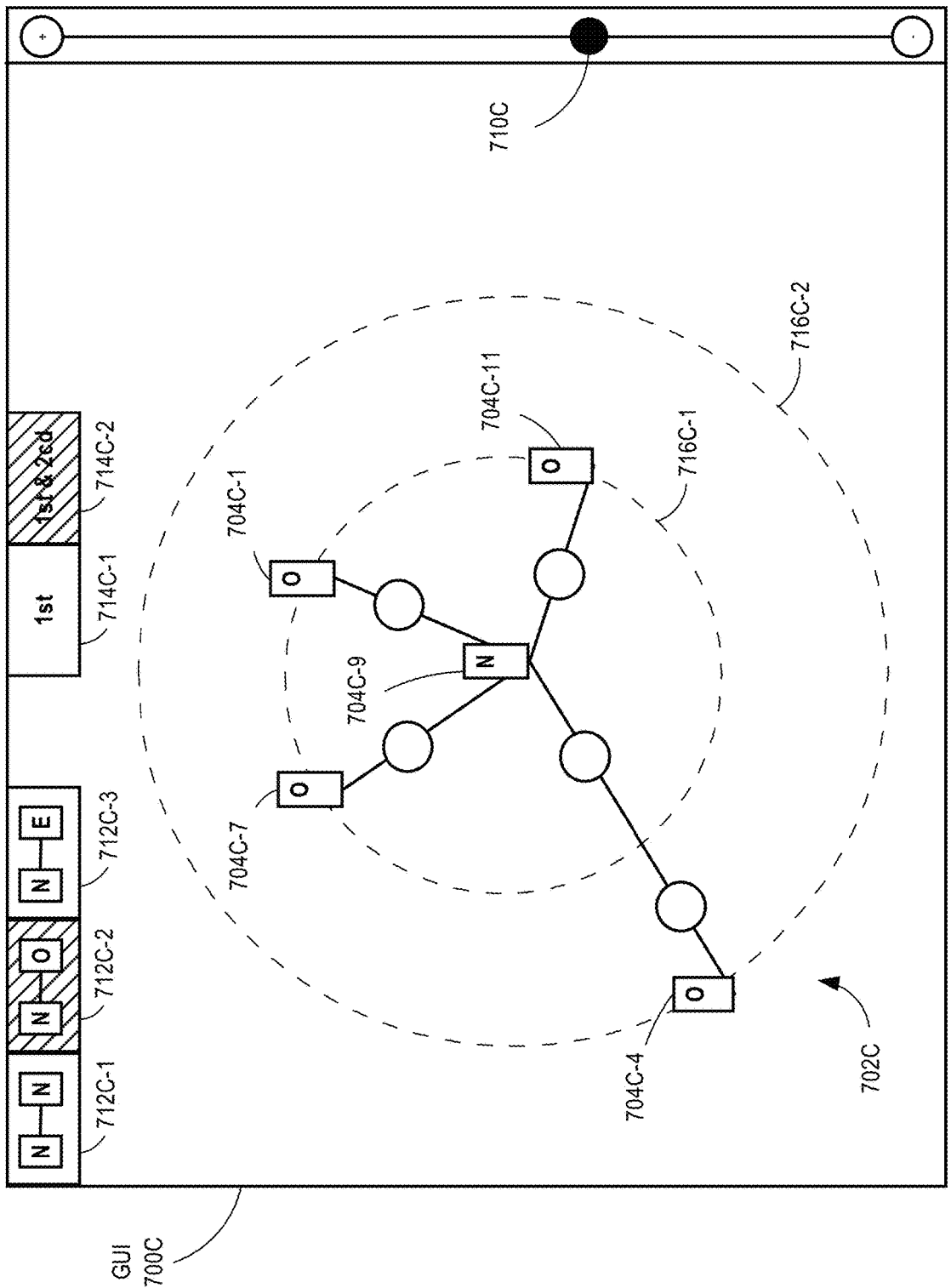
FIG. 7C illustrates a graphical user interface providing a note to object first and second degree connections view of the connected entity graph of FIG. 5C, according to some embodiments of the subject innovations.

FIG. 7C illustrates GUI 700C displayed in response to the user selecting node 704C-9, instead of node 704C-7, and then selecting controls 714A-2 in GUI 700A without changing the primary view of the connected entity graph 500C from the note-object primary view.

GUI 700C includes visual representation 702C of connected entity graph 500C in a concentric layout and shows all first and second degree connections between a selected Electronic Note entity 402C-9 and Object entities 402 in the connected entity graph 500C. In this example, node 704B-9 representing Electronic Note entity 402C-9 has been selected by the user to be the center node of the concentric layout. Accordingly, a first circle 716C-1 around node 704C-9 includes nodes 704C-1, 704C-7, and 704C-11 representing Project entity 402C-1, Person entity 402C-7, and Person entity 402C-11, respectively. Electronic Note entity 402C-9 also has a second degree relationship in connected entity graph 500C with Person entity 402C-4 as represented by node 704C-4 displayed on second circle 716C-2.

GUI 700C also provides zoom controls 710C like those discussed previously.

Electronic Note to Event First Degree Connections View Example

Figure 8A:
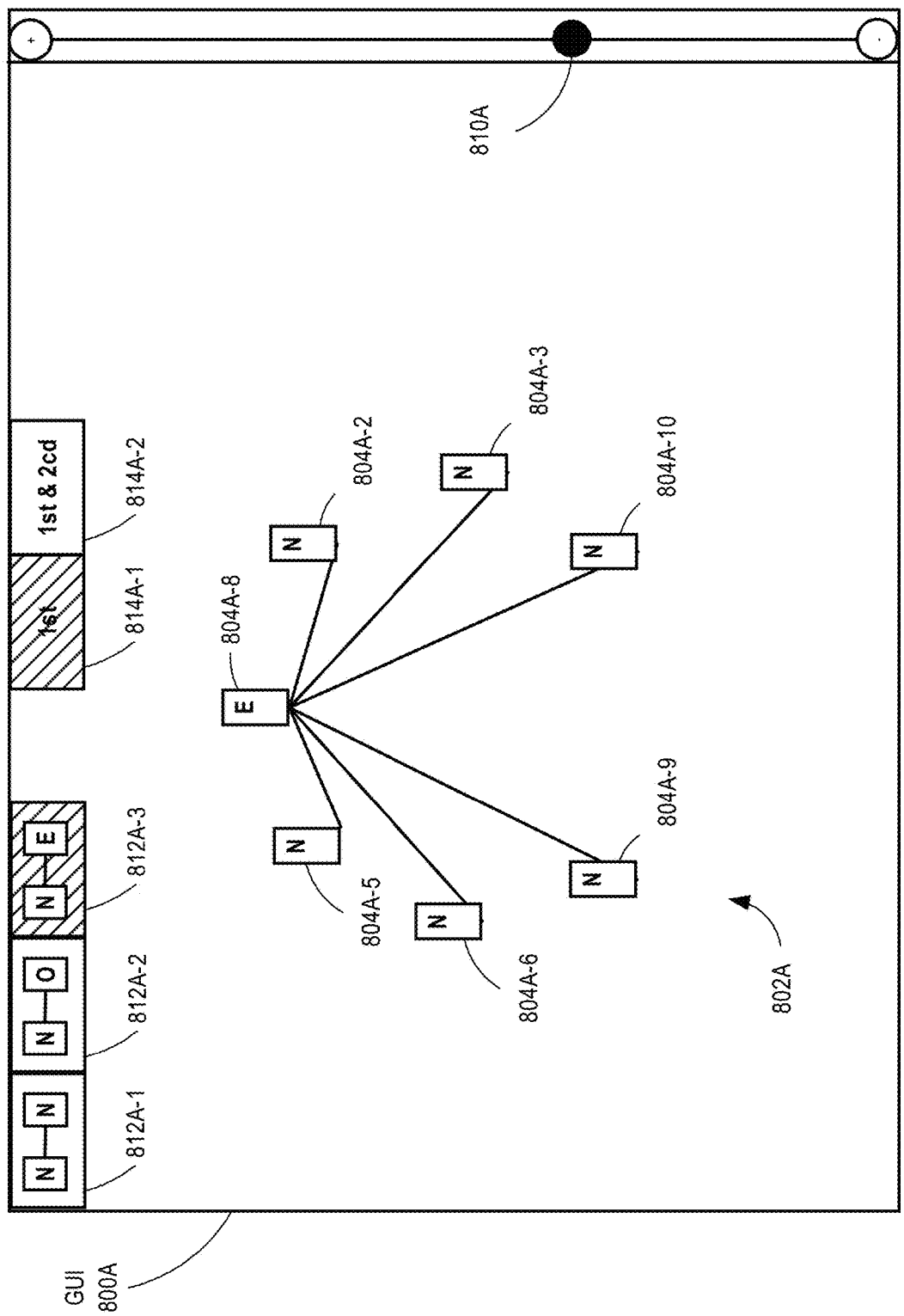
FIG. 8A illustrates a graphical user interface providing a note to event first degree connections view of the connected entity graph of FIG. 5C, according to some embodiments of the subject innovations.

Turning now to FIG. 8A, it illustrates a graphical user interface (GUI) 800A providing an electronic note to event first degree connections view of the connected entity graph 500C. In particular, the GUI 800A comprises a visual representation 802A of the first degree connections between the Electronic Note entities 402 and Event entities 402 in the connected entity graph 500C of FIG. 5C. Nodes 804A-2, 804A-3, 804A-9, 804A-10, 804A-12, and 804A-13 may represent Electronic Note entities 402C-2, 402C-3, 402C-9, 402C-10, 402C-12, and 402C-13, respectively. Node 804A-8 may represent Event entity 402C-8. GUI 800A may be displayed in response to the user selecting note-event view controls 712C-3 and first degree connections only controls 714C-1 in GUI 700C, for example.

Some nodes include the letter 'N' to indicate that each such node represents an Electronic Note entity 402 in the connected entity graph 500C. Some nodes include the letter 'E' to indicate that each such node represents an Event entity 402 in the connected entity graph 500C. Other visual indicators may be used in other embodiments to indicate the type 408 of entity 402 that a node represents. For example, a node may have the graphical appearance of a paper note or a piece of paper to indicate that the node represents an Electronic Note entity 402, as opposed to an Event entity 402, an Object entity 402, or some other type 408 of entity 402 that is not an Electronic Note entity 402. Another node may have the graphical appearance of a calendar or clock to indicate that the node represents an Event entity 402, as opposed to an Electronic Note entity 402, an Object entity 402, or some other type 408 of entity 402 that is not an Event entity 402.

GUI 800A also provides zoom controls 810A like those discussed above.

Electronic Note to Event First and Second Degree Connections View Examples

Figure 8B:
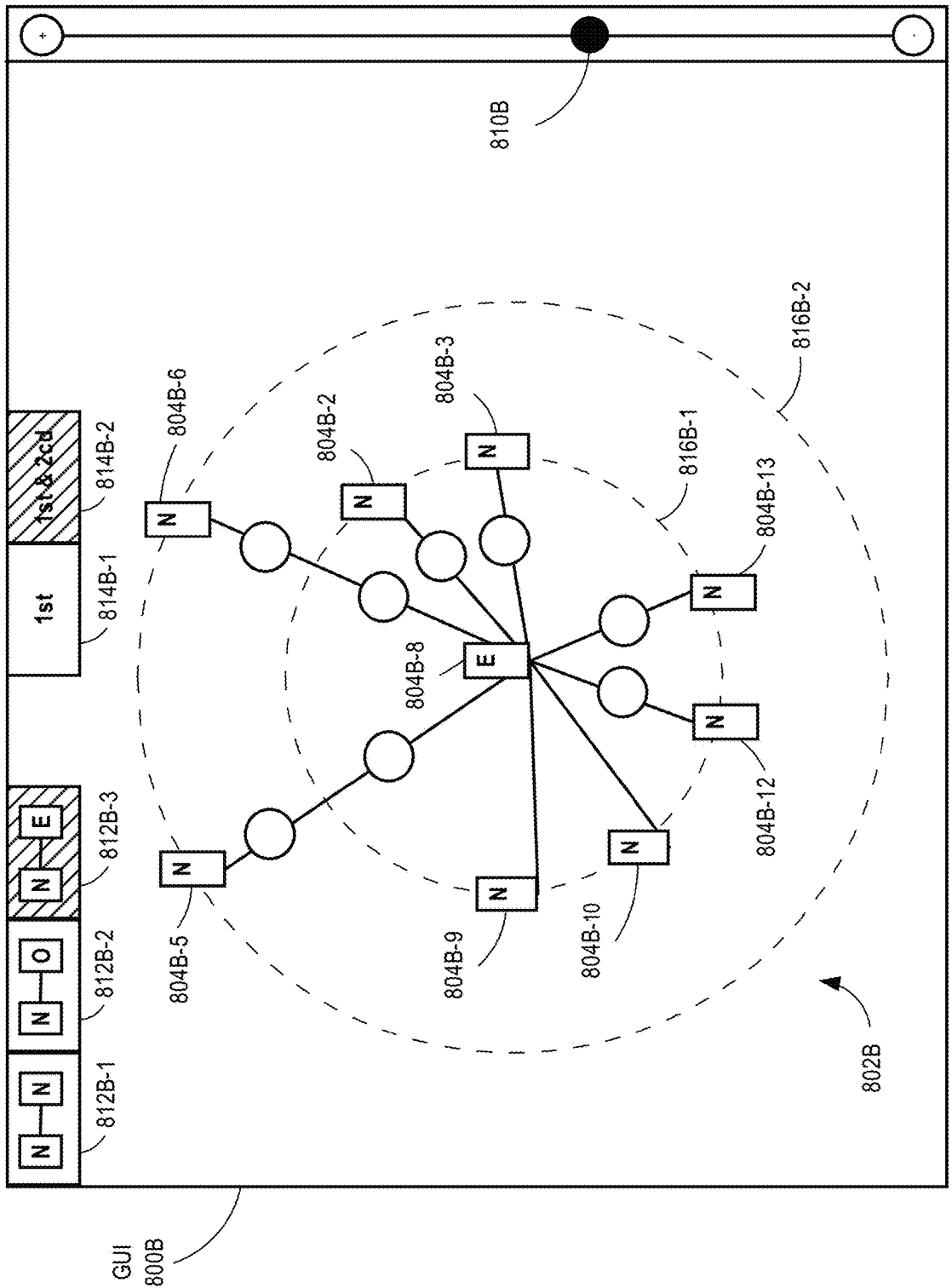
FIG. 8B illustrates a graphical user interface providing a note to event first and second degree connections view of the connected entity graph of FIG. 5C, according to some embodiments of the subject innovations.

FIG. 8B illustrates GUI 800B displayed in response to the user selecting node 804A-8 and then selecting controls 814A-2 in GUI 800A without changing the primary view of the connected entity graph 500C from the note-event primary view.

GUI 800B includes visual representation 802B of connected entity graph 500C in a concentric layout and shows all first and second degree connections between a selected Event entity 402 and Electronic Note entities 402 in the connected entity graph 500C. In this example, node 804B-8 representing Meeting entity 402C-8 has been selected by the user to be the center node of the concentric layout. Accordingly, a first circle 816B-1 around node 804B-8 includes nodes 804B-2, 804B-3, 804B-9, 804B-10, 804B-12, and 804B-13 representing Electronic Note entities 402C-2, 402C-3, 402C-9, 402C-10, 402C-12, and 402C-13, respectively. Meeting entity 402C-8 also has a second degree relationship in connected entity graph 500C with Electronic Note entities 402C-5 and 402C-6 as represented by nodes 804B-5 and 804B-6, respectively, on second circle 816B-2.

GUI 800B also provides zoom controls 810B like those discussed above.

Figure 8C:
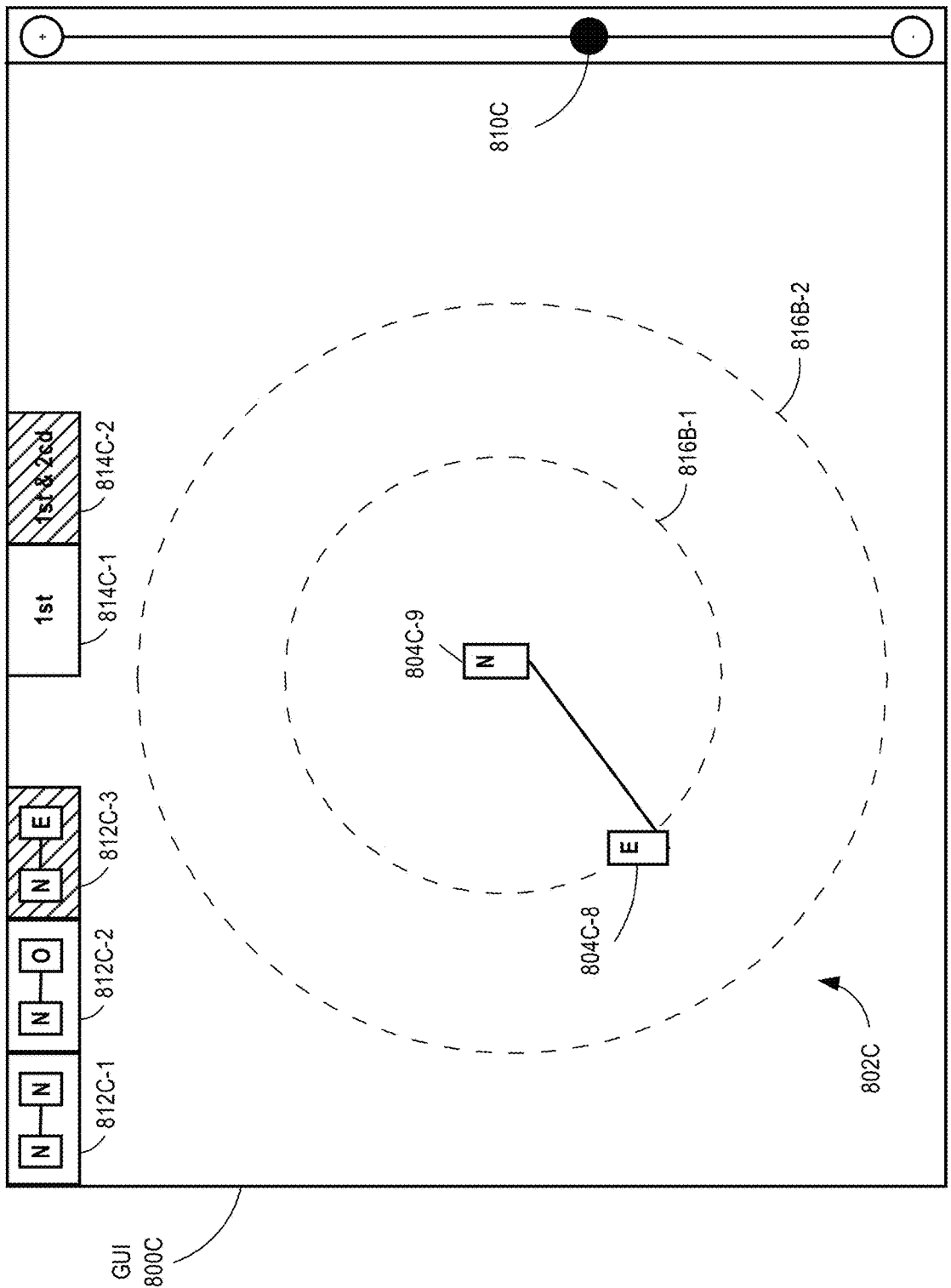
FIG. 8C illustrates a graphical user interface providing a note to event first and second degree connections view of the connected entity graph of FIG. 5C, according to some embodiments of the subject innovations

FIG. 8C illustrates GUI 800C displayed in response to the user selecting node 804A-9, instead of node 804A-7, and then selecting controls 814A-2 in GUI 800A without changing the primary view of the connected entity graph 500C from the note-event primary view.

GUI 800C includes visual representation 802C of connected entity graph 500C in a concentric layout and shows all first and second degree connections between a selected Electronic Note entity 402 and Event entities 402 in the connected entity graph 500C. In this example, node 804C-9 representing Electronic Note entity 402C-9 has been selected by the user to be the center node of the concentric layout. Accordingly, a first circle 816C-1 around node 804C-9 includes node 804C-8 representing Meeting entity 402C-8. Electronic Note entity 402C-9 does not have a second degree relationship with any Event entities 402 in connected entity graph 500C. Accordingly, no such second degree relationships are depicted in GUI 800C.

GUI 800C also provides zoom controls 810C like those discussed previously.

All Entitles View

While in some embodiments such as those exemplified by FIGS. 6A, 6B, 7A-7C, and 8A-8C a view of a connected entity graph is provided relative to a particular entity type 408 (e.g., Electronic Note) or particular entity types 408 (e.g., Electronic Note and Object), an "all entities view" of a connected entity graph is provided in other embodiments. In the "all entities view", the connected entity graph is represented as is. In particular, each edge in the visual representation corresponds to one or more links 422 between two entities 402 in the connected entity graph.

Figure 11:
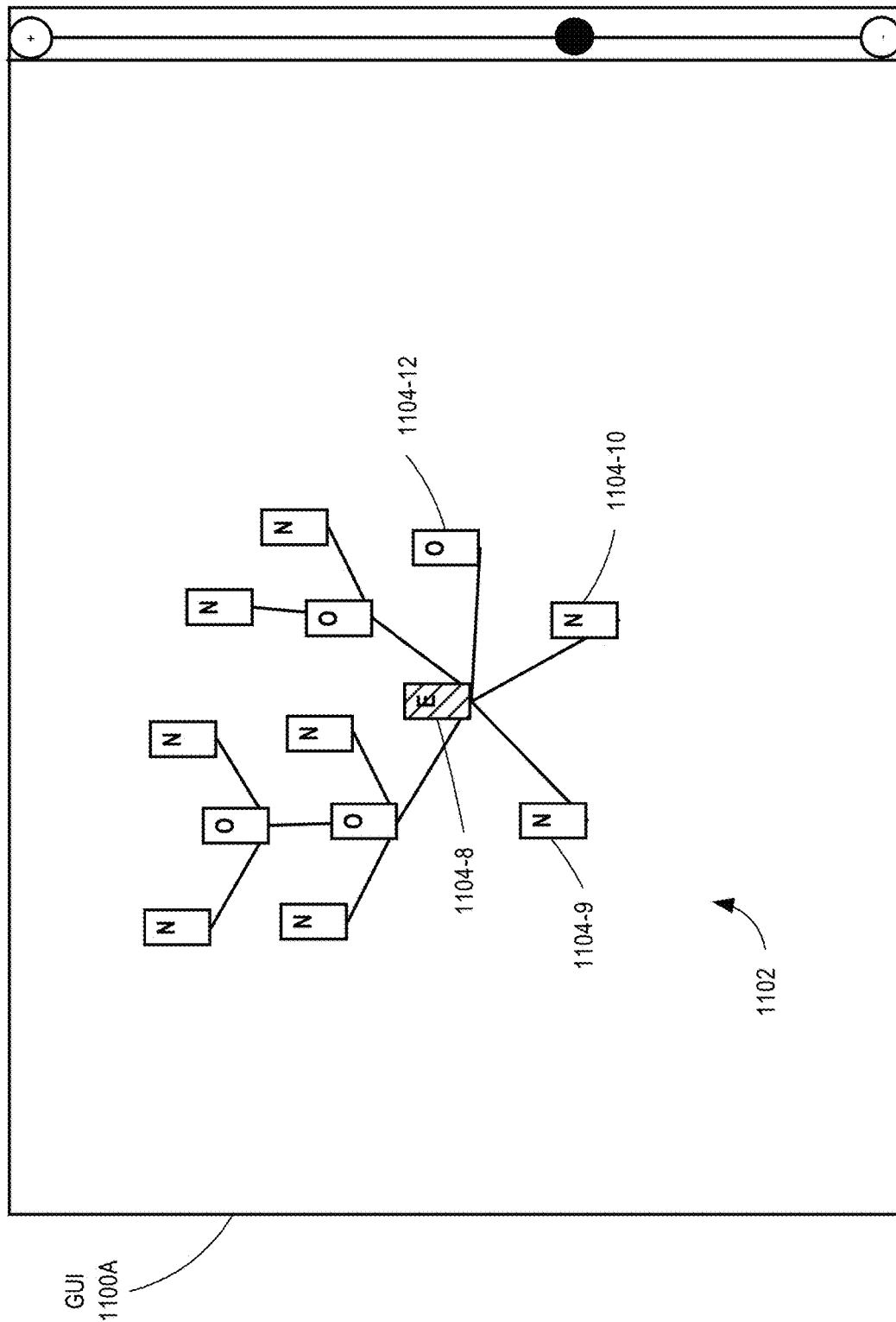
FIG. 11 illustrates a graphical user interface providing an all entities view of the connected entity graph of FIG. 5C, according to some embodiments of the subject innovations.

For example, FIG. 11 illustrates a graphical user interface (GUI) 1100 providing an all entities view of the connected entity graph 500C of FIG. 5C. In particular, the GUI 1100 comprises a visual representation 1102 of the basic connections between the entities 402 of the connected entity graph 500C of FIG. 5C. The all entities visual representation may be relative to a selected entity 402. For example, in the example of FIG. 11, entity 402C-8 of connected entity graph 500C is the selected entity 402 as represented by node 1104-8 and nodes 1104-9, 1104-10, and 1104-11 represent entities 402C-9, 402C-10, and 402C-11, respectively.

Electronic Note Visual Search Around

According to some embodiments, an application (e.g., 324), a dispatch server (e.g., 312), a database system (e.g., 314), and a search system (e.g., 316) interoperate to provide a connected entity graph visual search around feature to a user (e.g., 302) of a user computer (e.g., 304).

According to embodiments, the visual search around feature allows the user to define the precise parameters to be used to explore a connected entity graph, including which entities 402 should be used as links and which entities 402 should be the targets of the search and how many degrees of separation into the connected entity graph the search should delve.

According to embodiments, the visual search around feature is a tool for the user for uncovering, relationships, networks, and patterns involving electronic notes. The visual search around feature allows the user to search for connections between entities 402 by choosing a starting entities 402 and defining various link and target parameters to customize the search. The result of the search is an easily-interpretable visual representation of nodes and the relationships connecting them.

Visual Search Around Feature Basic Operation

The basic organization of the visual search around feature includes one or more "beginning" entities 402, one or more linking parameters, and one or more "target" entity types 408. A beginning entity 402 is an entity 402 in a connected entity graph that the user selects to be the origin of the search. The linking parameters are criteria for identifying the properties 402, entities 402, or links 422 related to the beginning entities 402 in the connected entity graph that the user wishes to use to link the beginning entities 402 with target entities 402. A linking parameter can be the Electronic Note entity type 408, for example. A target entity type 408 is a type 408 of entity 402 the user is searching for at the other end of the linking parameters.

For instance, a beginning entity 402 could be a Person entity 402, a linking parameter the Event entity type 408, and a target entity type 408 the Electronic Note entity type 408. The result of the search may display as nodes the Person entity 402 and all of the Electronic Note entities 402 that are associated in the connected entity graph with the Person entity 402 via an Event entity 402. The Event entities 402 themselves may be displayed by edges connecting the nodes.

As another example, if the beginning entity 402 is an Electronic Note entity 402, a linking parameter of the search might be the Appears In link type 428 and the target entity types 408 could be any entity type 408. The search will then look for target entities 402 of any type 408 are linked in the connected entity graph with the Electronic Note entity 402 via an Appears In link 422. The target entities 402 could be Event entities 402, Object entities 402, and other Electronic Note entities 402. In this example, the nodes displayed would be the beginning Electronic Note entity 402 and any Event entities 402, Object entities 402, and Electronic Note entities 402 related to that Electronic Note entity 402 via an Appears In link 422.

A search may be further refined by adjusting the search depth. The search depth represents how many iterations, or degrees of separation, away from the beginning entities 402 to search for target entities 402. Selecting a greater search depth causes the search to look more deeply into the connected entity graph.

Further, according to some embodiments, a user can apply filters to both linking parameters and target entities 402 in order make a search more specific.

Finally, according to some embodiments, the user can choose to search using any or all of the specified linking parameters.

Sample Visual Search Around Operation

According to some embodiments, a visual search around may be invoked by a user (e.g., 302) from the connected entity graph visual explorer graphical user interface. For example, FIG. 9 illustrates graphical user interface (GUI) 900A. GUI 900A provides a visual representation 902A of connected entity graph 500C. In particular, visual representation 902A provides an electronic note to electronic note first degree connections view of connected entity graph 500C. Accordingly, visual representation 902A includes nodes 904A-2, 904A-3, 904A-5, 904A-6, 904A-9, 904A-10, 904A-12, and 904A-13 that represent Electronic Note entities 402C-2, 402C-3, 402C-5, 402C-6, 402C-9, 402C-10, 402C-12, and 402C-13, respectively.

To begin a visual search around, the user selects one or more beginning entities 402 of the search. For example, the user may interact with user interface 900A to select node 904A-9 representing Electronic Note entity 402C-9. Such selection may be made in any suitable manner such as by clicking or double-clicking on the node 904A-9 using a pointing device or by a touch gesture directed to a touch-sensitive surface. GUI 900B may be displayed in response to the user selecting node 904A-9 in GUI 900A. In GUI 900B, node 904B-9 is highlighted to indicate that it has been selected by the user.

According to some embodiments, a visual search around button is displayed or is activated in the graphical user interface in response to the user selecting a node in the visual representation of a connected entity graph. The visual search around button allows the user to initiate a search using the selected entity 402 or entities 402 as the beginning entity 402 or entities 402 of the search. For example, GUI 900B shows visual search around button 918B-1 displayed in response to the user selecting node 904A-9 in GUI 900A. In an alternative embodiment, the user may right-click or otherwise direct input to the selected node 904B-9 to reveal a pop-up menu that provides a visual search around option.

Figure 9A:
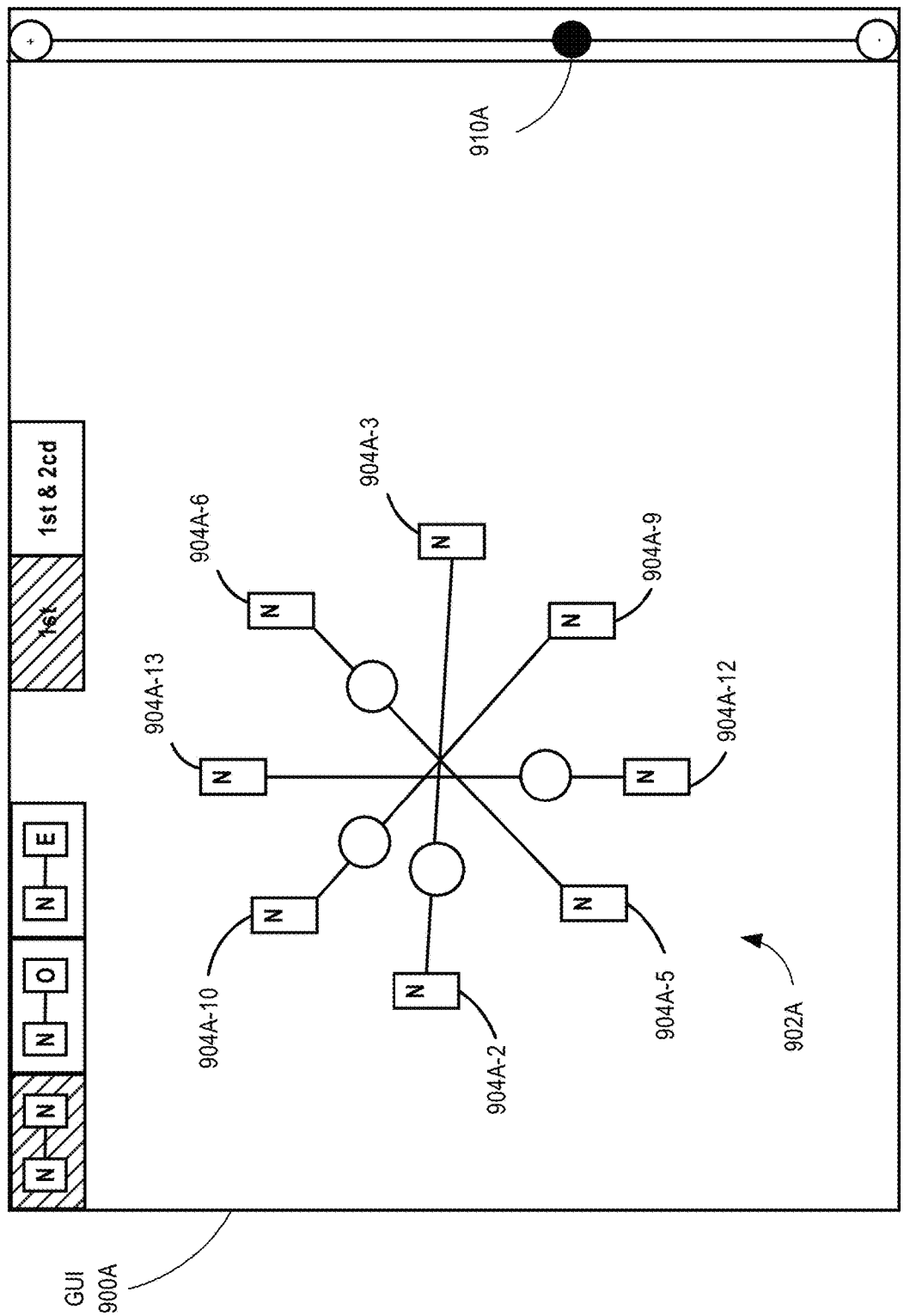
FIGS. 9A-9H illustrates graphical user interfaces of a visual search around feature, according to some embodiments of the subject innovations.
Figure 9B:
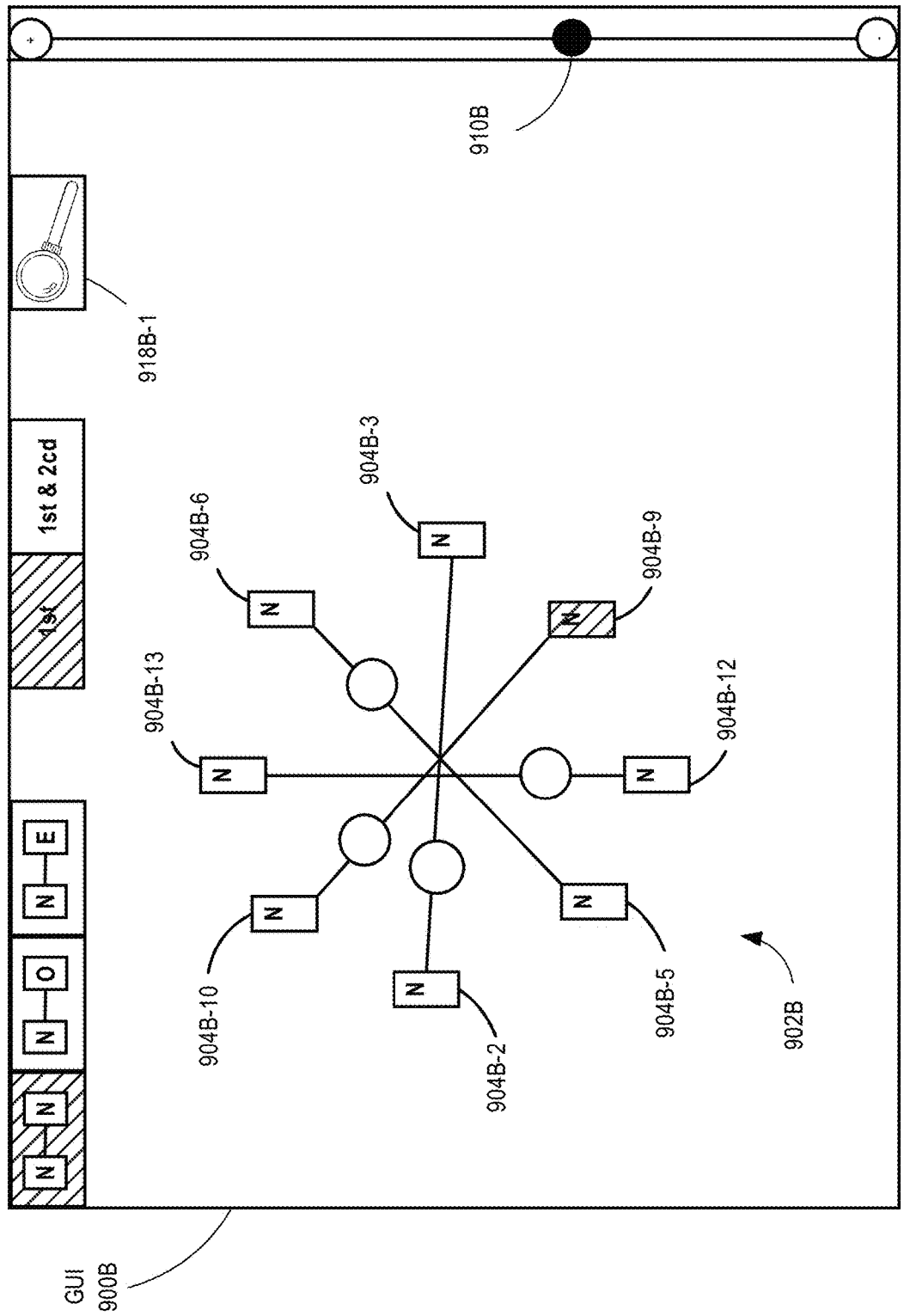
Figure 9C:
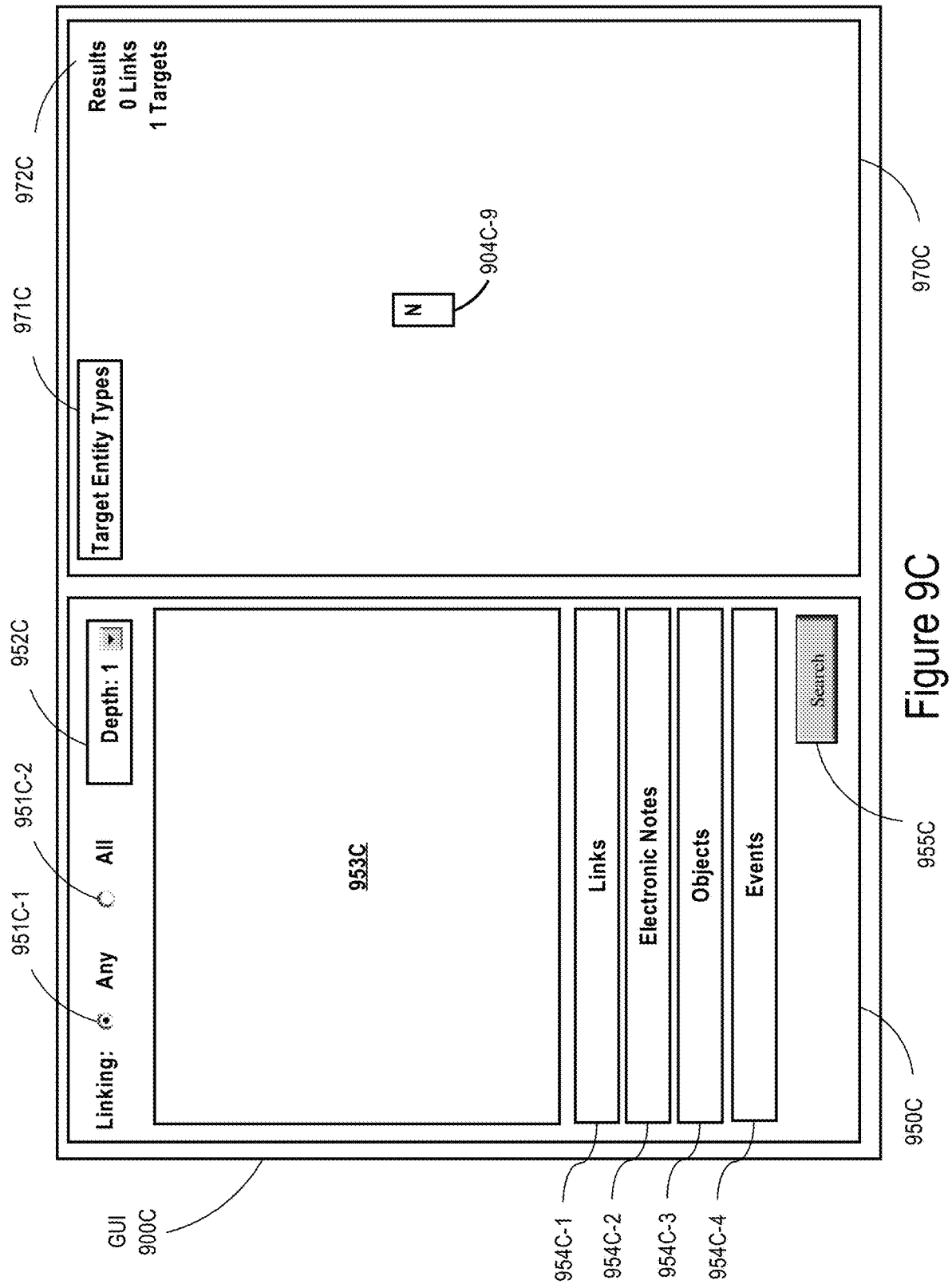

FIG. 9C illustrates GUI 900C displayed in response to the user selecting visual search around option 918B-1 in GUI 900B. GUI 900C allows the user to specify the criteria of the search. GUI includes linking parameters panel 950C and search results panel 970C. At this point, since only the beginning entity 402C-9 of the search has been selected, the only result shown in results panel 970C is node 904C-9 as a indicated by results summary indicator 972C.

Linking parameters panel 950C includes checkbox controls 951C-1 and 951C-2, search depth controls 952C, linking parameters sub-panel 953C, and link parameters selection buttons 954C-1, 954C-2, 954C-3, and 954C-4. Linking parameters panel 950C also includes search button 955C.

A linking parameter specifies how a source entity 402 may be linked in a first degree connection with a target entity 402 during the search. In other words, for a given source entity 402 and all entities 402 having a first degree connection with the given source entity 402 in the connected entity graph that are at least one of the target entity types 408, the linking parameter(s) specified by the user determines which of those candidate target entities 402 are target entities 402 in the search result. At the initial depth of the search, the source entity 402 is one of the selected beginning entities 402. At the next and subsequent depths of the search, if the search depth is greater than one, the source entity 402 is one of the target entities 402 identified at the previous search depth. The search stops when the search depth has been reached or no target entities 402 are identified at the current search depth.

Panel 950C allows the user to specify one or more linking parameters that will be used for the search. Each linking parameter the user specifies is listed in sub-panel 953C. Controls 951C-1 and 951C-2 control how multiple linking parameters are treated during the search. If controls 951C-1 are selected, then a source entity 402 may be linked with a candidate target entity 402 during the search if any one of the multiple linking parameters is satisfied by the first degree connection between the source entity 402 and the candidate target entity 402. On the other hand, if controls 951C-2 are selected, then a source entity 402 may be linked with a candidate target entity 402 during the search only if all of the multiple linking parameters are satisfied by the first degree connection between the source entity 402 and the candidate target entity 402.

Controls 952C determine the search depth. For example, the search depth selected might be one, two, three, four, etc.

Sub-panel 953C displays any linking parameters currently selected for the search.

Button 954C-1 allows the user to add a link type 428 linking parameter. A source entity 402 and a candidate target entity 402 may satisfy a specified link type 428 linking parameter during a search if the source entity 402 and the candidate target entity 402 are linked in the connected entity graph by a first degree basic connection by a link 422 of the specified link type 428. Activating button 954C-1 may cause a pop-up dialog or other window to appear in the graphical user interface that allows the user to select one link type 428 in a list of selectable link types 428. The list of selectable link types 428 may be all link types 428 defined in the data type ontology or a selected subset thereof. For example, the list of selectable link types 428 may be based on valid link types 428 for the types 408 of the beginning entities 402 and the target entity types 408 involved in the search as defined in the data type ontology.

Button 954C-2 allows the user to add an Electronic Note entity type 408 linking parameter. A source entity 402 and a candidate target entity 402 may satisfy a specified Electronic Note entity type 408 linking parameter during a search if the source entity 402 and the candidate target entity 402 are linked in the connected entity graph by first degree complex connection by an intermediary entity 402 that is the specified Electronic Note entity type 408. The specified Electronic Note entity type 408 can be the Electronic Note base entity type 408 or a sub-entity type 408 thereof. Activating button 954C-2 may cause a pop-up dialog or other window to appear in the graphical user interface that allows the user to select one Electronic Note entity type 408 in a list of selectable Electronic Note entity types 408. The list of selectable Electronic Note entity types 408 may be all Electronic Note entity types 408 defined in the data type ontology or a selected subset thereof.

Button 954C-3 allows the user to add an Object entity type 408 linking parameter. A source entity 402 and a candidate target entity 402 may satisfy a specified Object entity type 408 linking parameter during a search if the source entity 402 and the candidate target entity 402 are linked in the connected entity graph by first degree complex connection by an intermediary entity 402 that is the specified Object entity type 408. The specified Object entity type 408 can be the Object base entity type 408 or a sub-entity type 408 thereof. Activating button 954C-3 may cause a pop-up dialog or other window to appear in the graphical user interface that allows the user to select one Object entity type 408 in a list of selectable Object entity types 408. The list of selectable Object entity types 408 may be all Object entity types 408 defined in the data type ontology or a selected subset thereof.

Button 954C-4 allows the user to add an Event entity type 408 linking parameter. A source entity 402 and a candidate target entity 402 may satisfy a specified Event entity type 408 linking parameter during a search if the source entity 402 and the candidate target entity 402 are linked in the connected entity graph by first degree complex connection by an intermediary entity 402 that is the specified Event entity type 408. The specified Event entity type 408 can be the Event base entity type 408 or a sub-entity type 408 thereof. Activating button 954C-4 may cause a pop-up dialog or other window to appear in the graphical user interface that allows the user to select one Event entity type 408 in a list of selectable Event entity types 408. The list of selectable Event entity types 408 may be all Event entity types 408 defined in the data type ontology or a selected subset thereof.

Figure 9D:
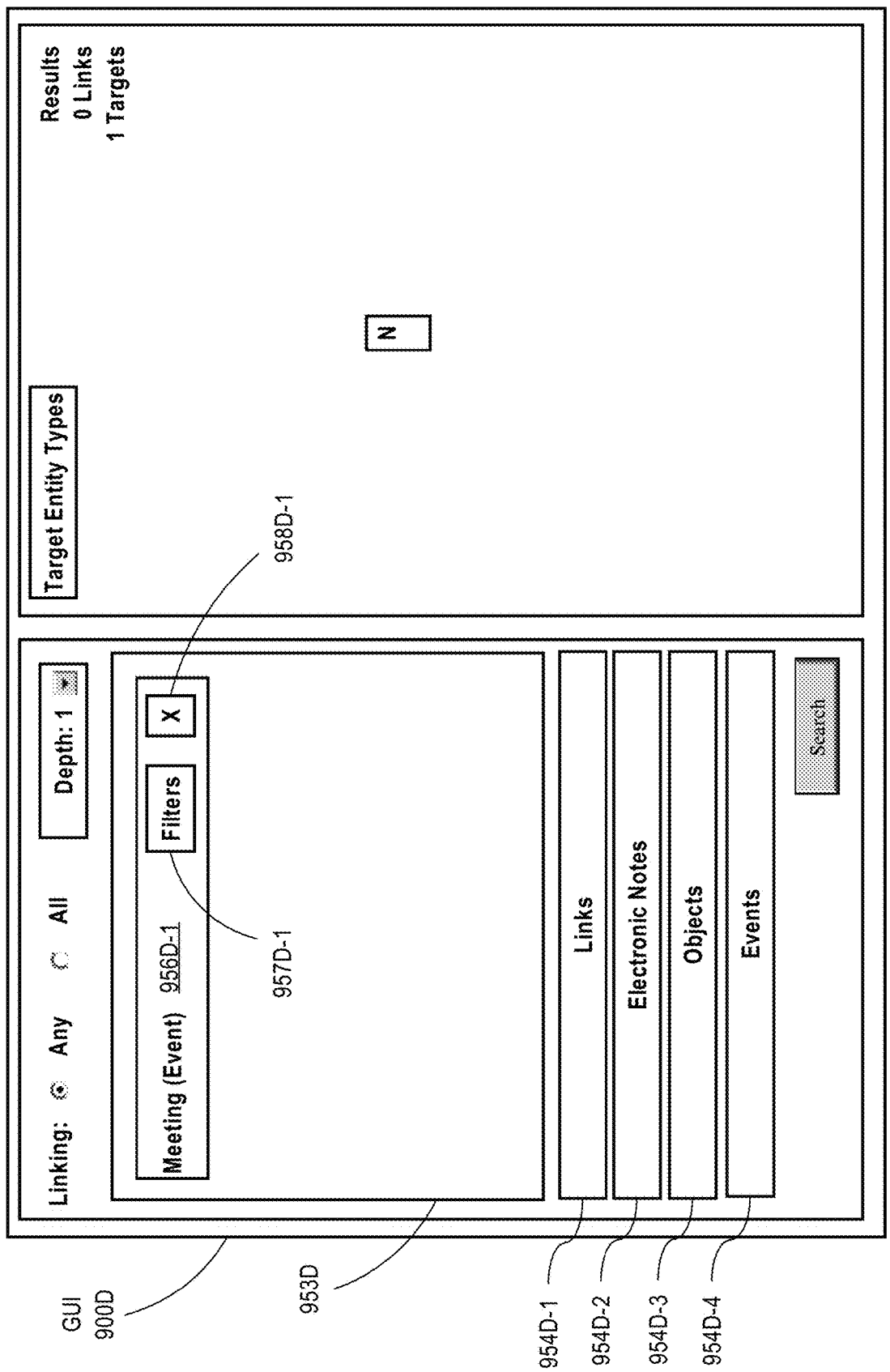

Turning now to FIG. 9D, it illustrates GUI 900D. GUI 900D may be displayed, for example, in response to the user selecting Events button 954C-4 in GUI 900C and then selecting the Meeting entity type 408 from a list of selectable Event entity types 408 presented to the user. A linking parameter indicator panel 956D-1 is displayed in the sub-panel 953D area to represent the user's selection of the linking parameter for the search to be performed. The indicator panel 956D-1 displays the text "Meeting (Event)" to indicate that the linking parameter is a Meeting entity type 408 linking parameter and also to indicate that the Meeting entity type 408 is a sub-entity type of the Event base entity type 408. If a base entity type 408 is instead selected as a linking parameter, the corresponding indicator panel may display just the name (e.g. "Event") of base entity type 408. In this example, the indicator panel 956D-1 also provides filters button 957D-1 and delete button 958D-1.

The filters button, when activated, may provide a pop-up dialog or other graphical user interface (not shown) that allows the user to specify one or more filters on properties 412 of entities 402 of the linking parameter's entity type 408. Each such filter constrains the entities 402 in the connected entity graph of the linking parameter's entity type 408 that can be a valid intermediary entities 402 for linking a source entity 402 to a candidate target entity 402 during the search. A candidate intermediary entity 402 of the linking parameter's entity type 408 must satisfy any and all filters of the linking parameter in order for the candidate intermediary entity 402 to be a valid intermediary entity for linking a source entity 402 to a candidate target entity 402 during the search.

For example, filters button 957D-1 may provide a pop-up dialog or other graphical user interface (not shown) that allows the user to specify one or more filters on one or more properties 412 of Meeting entities 402. Each such filter constrains which Meeting entities 402 in the connected entity graph to search that can be a valid intermediary Meeting entity 402 for linking a source entity 402 to a candidate target entity 402 during the search.

A filter for a linking parameter may specify a type 418 of an allowed property 412 of the linking parameter's entity type 408. For example, if the data ontology specifies that an entity 402 of the Event entity type 408 may have a property 412 of the Date property type 418, then a filter for the linking parameter 956D-1 may specify the Date property type 418. In this case, the Date property 412 may be a valid property of a Meeting entity 402 because the Meeting entity type 408 is a sub-entity type of the Event entity type 408.

Once a property type 418 for a filter has been selected by the user, then the user may also specify an expression to be matched against the value 420 of a property 412 of that property type 418. The expression can be an equality expression, an enumeration expression, a range expression, or a regular expression. For example, a filter for the linking parameter 956D-1 may specify the Date property type 418 and a particular calendar date as an equality expression for the filter. The value 420 of a Date property 412 may be deemed to satisfy the filter if the value 420 matches the particular calendar date for the filter. As another example, the filter may instead specify a particular range of calendar dates as a range expression for the filter. In this case, the value 420 of the Date property 412 may be deemed to satisfy the filter if the value 420 is within the particular range of calendar dates. As yet another example, the filter may instead specify a set of two more discrete dates as an enumeration expression for the filter. In this case, the value 420 of the Date property 412 may be deemed to satisfy the filter if the value 420 matches one of the discrete dates. As yet another example, the filter may instead specify a particular regular expression for the filter. In this case, the value 420 of the Date property 412 may be deemed to satisfy the filter if the value 420 satisfies the particular regular expression.

User may activate delete controls 958D-1 to remove linking parameter 956D-1 from the set of linking parameters to be used for the current search.

Figure 9E:
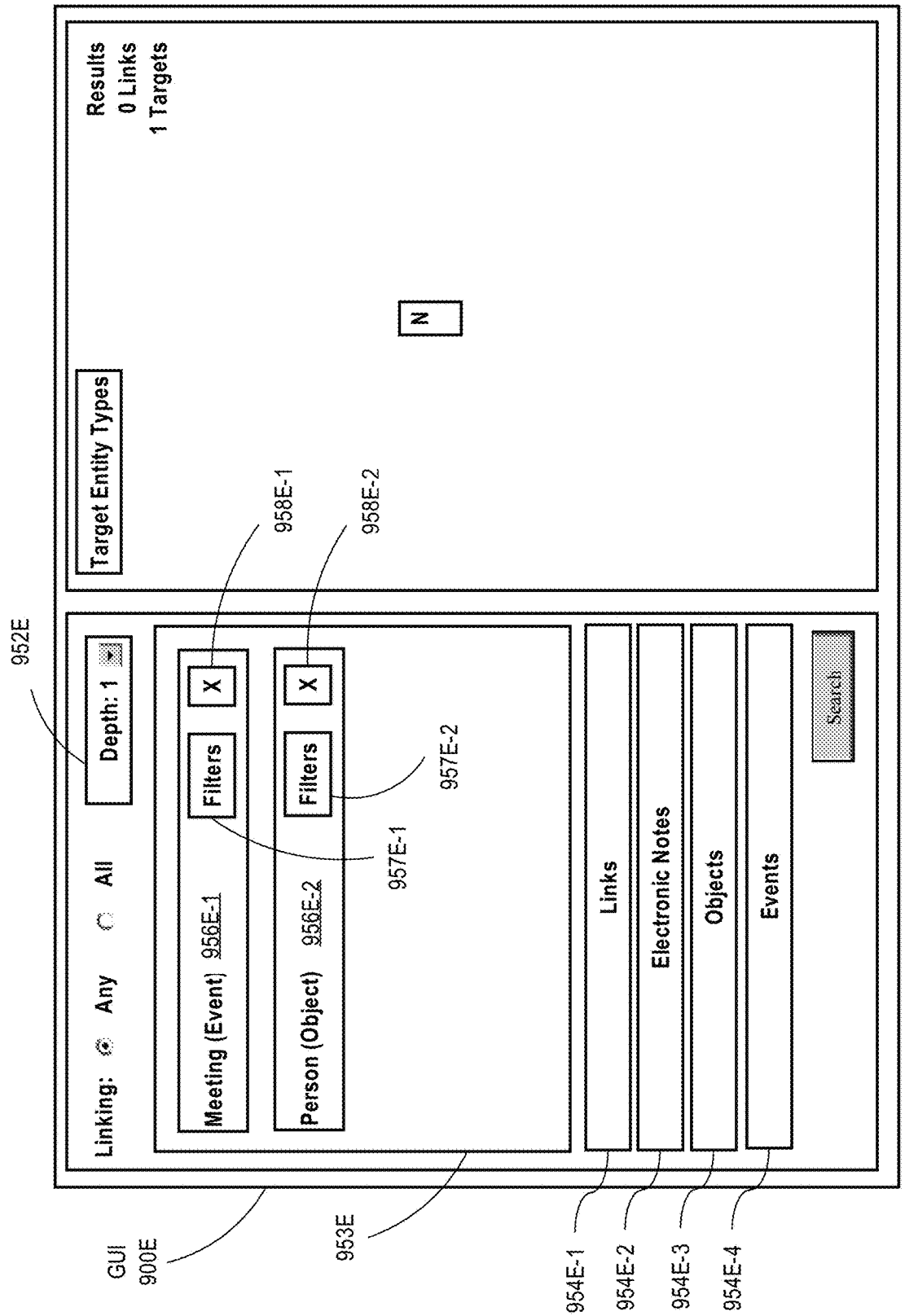

Turning now to FIG. 9E, it illustrates GUI 900E. GUI 900E may be displayed, for example, in response to the user selecting Objects button 954D-4 in GUI 900D and then selecting the Person entity type 408 from a list of selectable Object entity types 408 presented to the user. Sub-panel displays selected linking parameter indicator panel 958E-1 corresponding to linking parameter indicator panel 958D-1 of GUI 900D. In addition, a linking parameter indicator panel 956E-2 is displayed in the sub-panel 953E area to represent the user's selection of the additional linking parameter for the search to be performed. The indicator panel 956E-2 displays the text "Person (Object)" to indicate that the linking parameter is a Person entity type 408 linking parameter and also to indicate that the Person entity type 408 is a sub-entity type of the Object base entity type 408. If a base entity type 408 is instead selected as a linking parameter, the corresponding indicator panel may display just the name (e.g. "Object") of the base entity type 408. In this example, the additional indicator panel 956E-2 also provides filters button 957E-2 and delete button 958E-2 that operate like filters button 957D-1 and delete button 957D-1 discussed above, except with respect to linking parameter 956E-2.

Figure 9F:
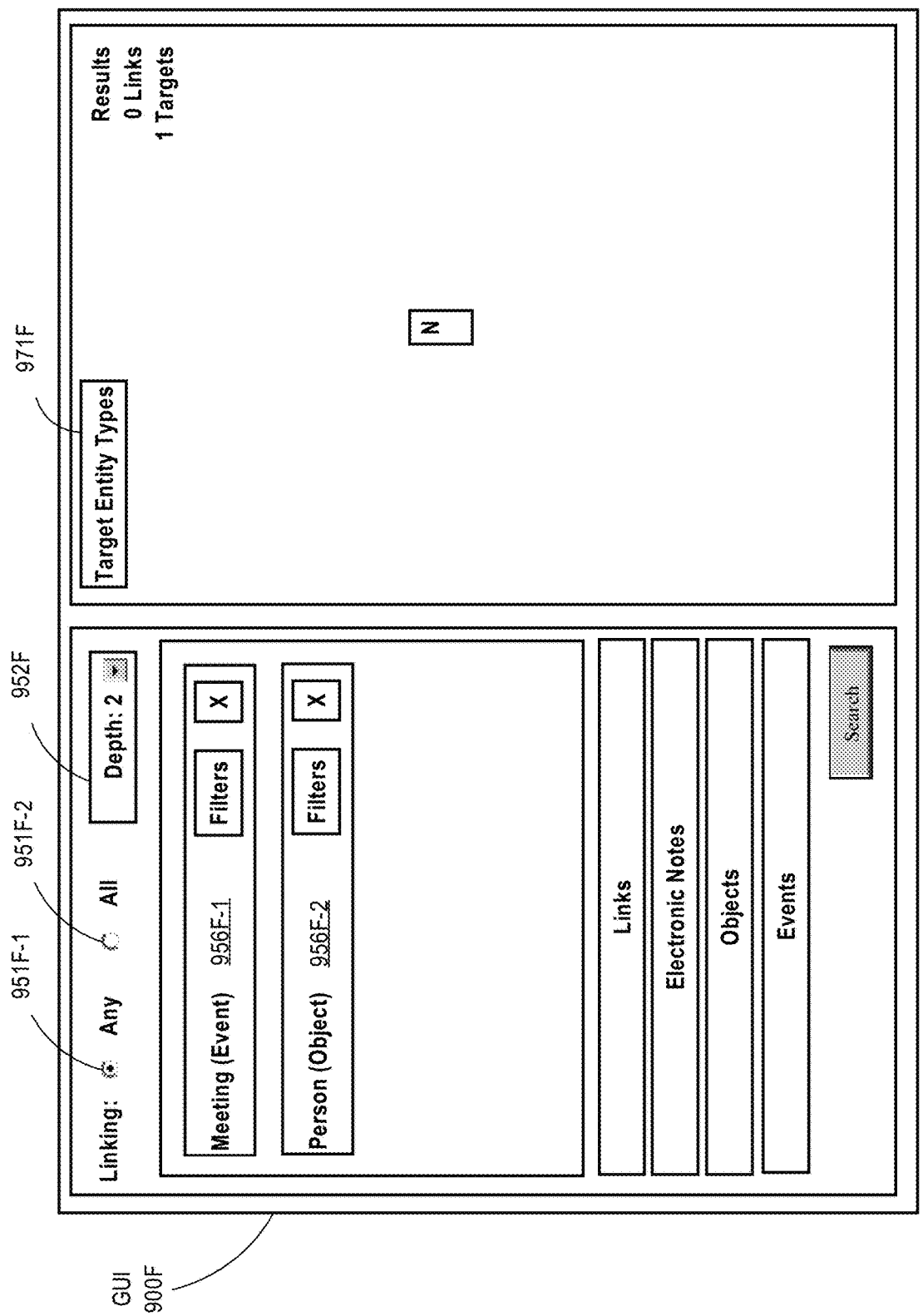

Turning now to FIG. 9F, it illustrates GUI 900F displayed in response to selecting a search depth of 2 using controls 952E in GUI 900E. Controls 951F-1, as opposed to controls 951F-2, remain selected. As a result, only one of linking parameters 956F-1 and 956F-2 need be satisfied in order to link a source entity 402 to a candidate target entity 402 during the search, as opposed to all of the linking parameters 956F-1 and 956F-2. If instead of controls 951F-1 being selected, controls 951F-2 were selected instead, both of the linking parameters 956F-1 and 956F-2 would need to be satisfied in order to link a source entity 402 to a candidate target entity 402 during the search.

At this point, the user has selected a beginning entity 402C-9 and two linking parameters 956F-1 and 956F-2. Assuming no filters are specified on linking parameter 956F-1, linking parameter 956F-1 is satisfied for a given source entity 402 and a given candidate target entity 402 if a) the given source entity 402 has a first degree complex connection with the given candidate target entity 402 via a Meeting entity 402 in the connected entity graph under search. Assuming no filters are specified on linking parameter 956F-2, linking parameter 956F-2 is satisfied for a given source entity 402 and a given candidate target entity 402 if b) the given source entity 402 has a first degree complex connection with the given candidate target entity 402 via a Person entity 402 in the connected entity graph under search. Since controls 951F-1 are selected, the set of linking parameters 956F-1 and 956F-2 are satisfied for a given source entity 402 and a given candidate target entity 402 if either a) or b) is satisfied.

Before initiating the search of the connected entity graph, the user may specify one or more target entity types 408. Only the selected target entity types 408 and any sub-entity types thereof defined in the data type ontology can be target entities 402 in the search result. According to some embodiments, the default set of target entity types 408 includes the Electronic Note entity type 408, the Object entity type 408, and Event entity type 408. If this set of target entity types 408 is selected by the user for the search, then any entity 402 in the connected entity graph that one of these entity types 408 or a sub-entity type 408 thereof can be a target entity 402 in the search result.

Figure 9G:
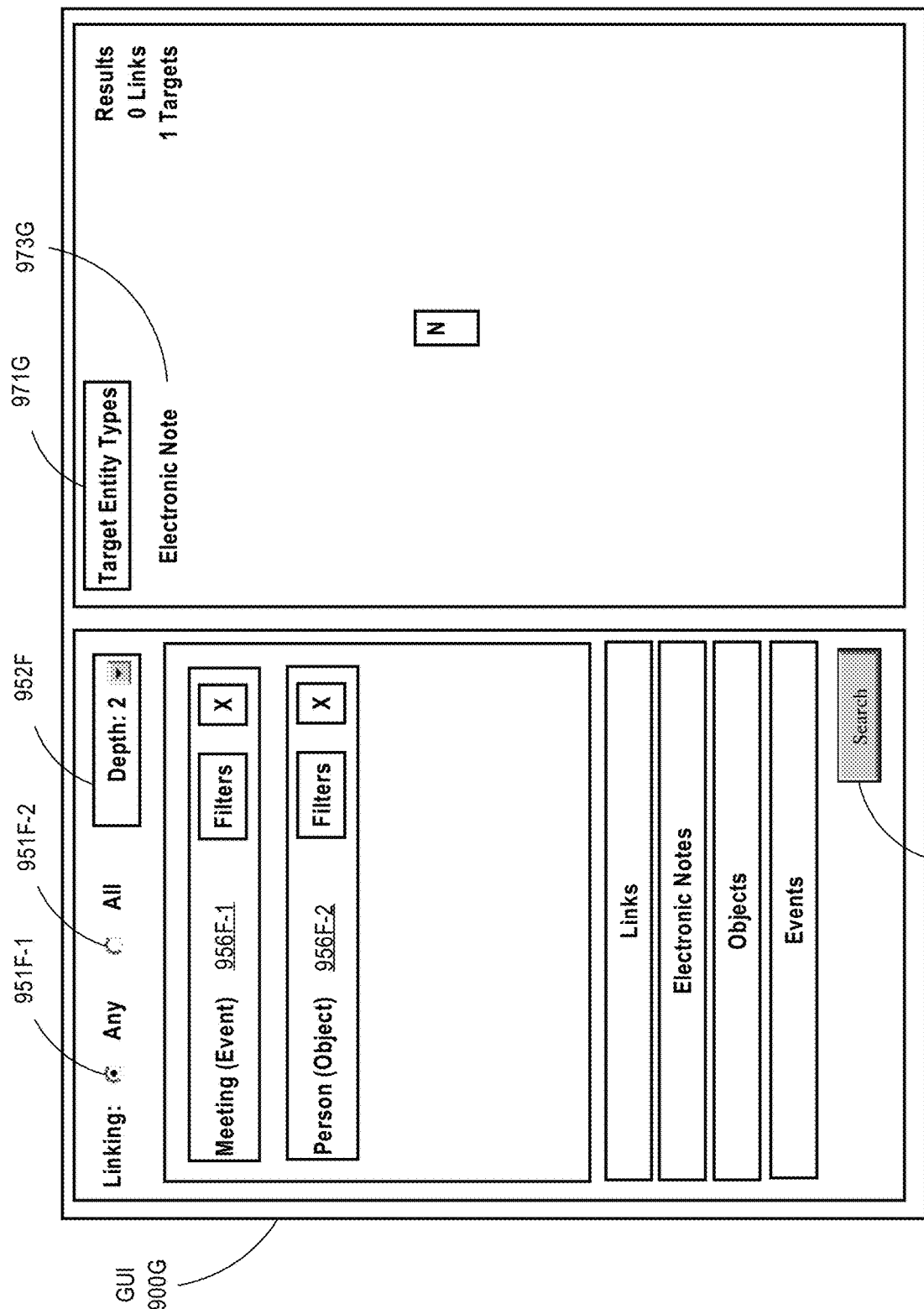

Turning now to FIG. 9G, it illustrates GUI 900G which shows that the user has selected the Electronic Note entity type 408 as a target entity type 408. For example, GUI 900G may be displayed in response to the user selecting button 971F in GUI 900F and selecting the Electronic Note entity type 408 from a list of entity types 408 presented to the user. The list of entity types 408 may list all entity types 408 defined in the data type ontology or a selected subset thereof. In this example, the user has selected only one target entity type 408. However, the user can select more than one target entity type 408, if desired.

At this point, the user may be ready to start the search. To do so, the user may activate the search button 955G.

Figure 9H:
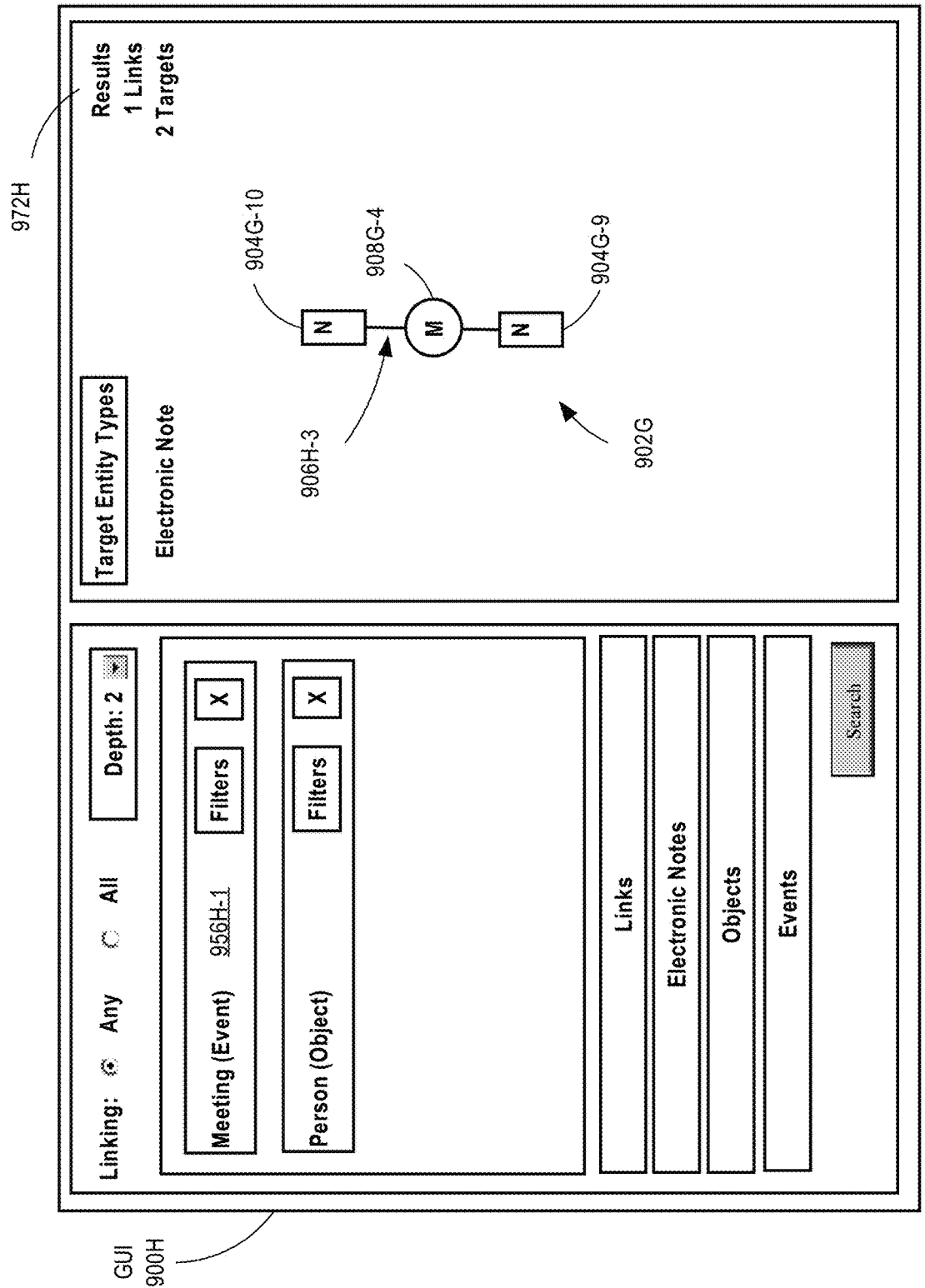

Turning now to FIG. 9H, it illustrates GUI 900H displayed in response to the user activating search button 955G in GUI 900G. GUI 900H shows search result 902H. The search result is a visual representation of the beginning entities 402 and the target entities 402 of the search result. The beginning entities 402 and the target entities 402 of the search result are represented in the visual representation as nodes. The first degree connections that satisfy the linking parameters of the search are represented in the visual representation as edges connecting the nodes.

For example, search result 902H includes nodes 904H-9 and 904H-10 representing Electronic Note entities 402C-9 and 402C-10 of connected entity graph 500C, respectively. Electronic Note entity 402C-9 is a target entity 402 in the search result 902H because it was selected by the user as a beginning entity 402. Electronic Note entity 402C-10 is also a target entity 402 in the search result 902H because the type of Electronic Note entity 402C-10 is one of the target entity types selected by the user for the search and because Electronic Note entity 402C-10 has a first degree connection in connected entity graph 500C with Electronic Note entity 402C-9 via intermediary Meeting entity 402C-8 that satisfies linking parameter 956H-1. Edge 906H-3 represents the first degree complex connection in connected entity graph 500C between Electronic Note entities 402C-9 and 402C-10 via intermediary Meeting entity 402C-8. A complex connection indicator 908G-4 is displayed on the edge 906H-3 to represent the intermediary Meeting entity 402C-8. Finally, results summary indicator 972H is updated to indicate that the search result 902H includes two target entities 402 (i.e., 402C-9 and 402C-10) and one first degree connection (i.e., between entities 402C-9 and 402C-10).

Method of Operations

FIG. 1000 comprises a flowchart 1000 illustrating a high-level method of operation of the electronic note management system of the subject innovations invention in searching for electronic notes via a connected entity graph. The following description presents method steps that may be implemented using computer-executable instructions, for directing operation of one or more devices under processor control. The computer-executable instructions may be stored on one or more computer-readable media, such as CD, DVD, hard disk, flash memory, or the like. The computer-executable instructions may also be stored as a set of downloadable computer-executable instructions, for example, for down-loading and installation from an Internet location (e.g., Web server). The following discussion uses the operations of the system of the present invention in the client/server networked computing environment 300 of FIG. 3 as an example, however a similar approach may also be used in other operating environments.

As described above, a user (e.g., 302) may interact with an electronic note management system (e.g., 310) over a network communications channel (e.g., 318) via an application (e.g., 324) executing on a user computer (e.g., 304). The application, in conjunction with data received by the application from the electronic note management system, may drive a graphical user interface (e.g., 215, 600A-C, 700A-C, 800A-C, and 900A-H) presented on a one or more display screens of or operatively coupled to the user computer.

Figure 10:
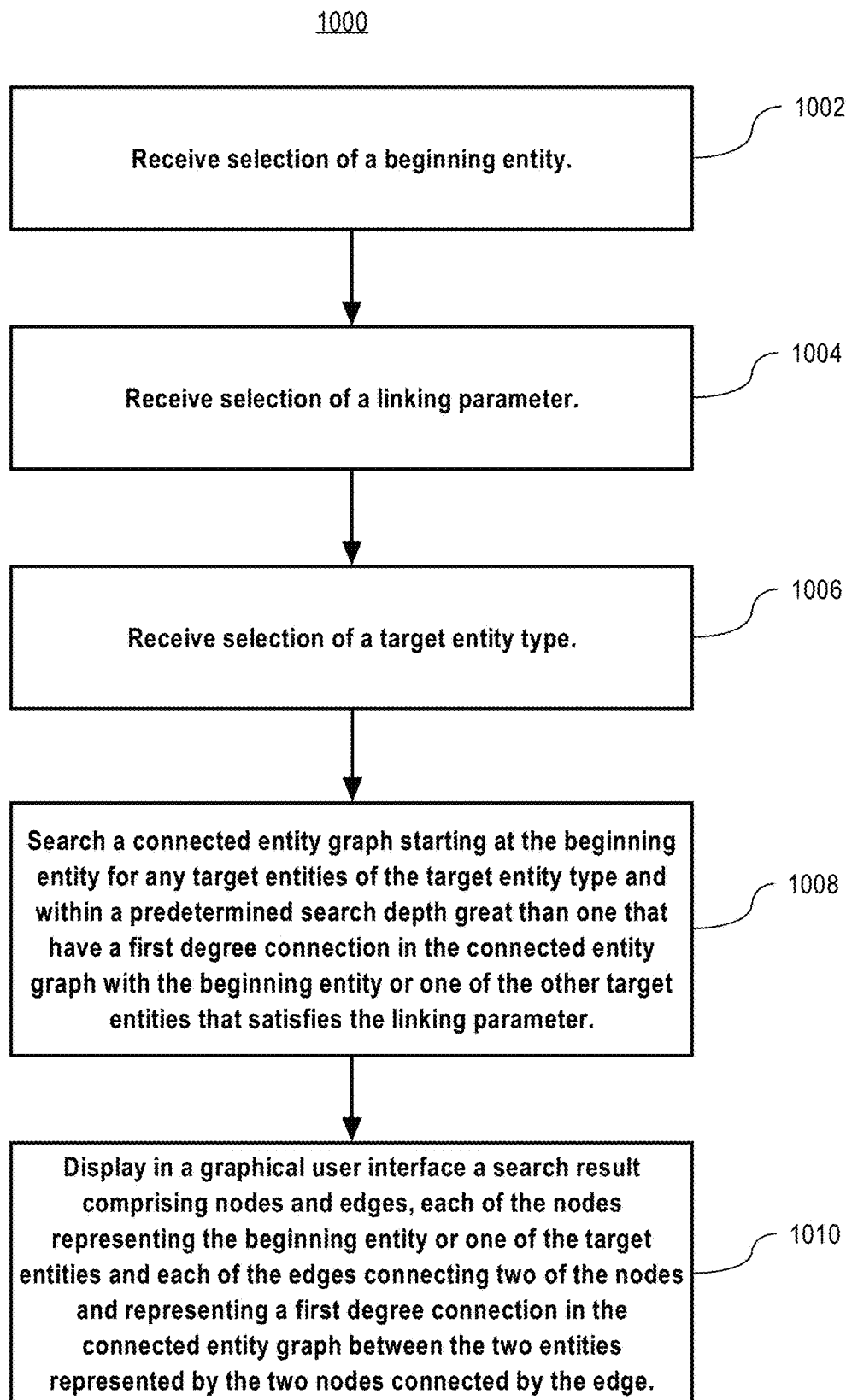
FIG. 10 is a flowchart of a method of operation for searching for electronic notes via a connected entity graph, according to some embodiments of the subject innovations.

As shown in FIG. 10, at step 1002, selection of a beginning entity in a connected entity graph is received. For example, the application may receive the selection from the user through a graphical user interface. For example, the application may receive, but is not limited to receiving, selection of the beginning entity in the manner described above with respect to FIG. 9B.

At step 1004, selection of a linking parameter is received. For example, the linking parameter can be a link type linking parameter, an event type linking parameter, an object type linking parameter, or an electronic note type linking parameter as described above with respect to FIGS. 9C, 9D, and 9E. For example, the application may receive selection of the linking parameter from the user through a graphical user interface. For example, the application may receive, but is not limited to receiving, selection of the linking parameter in the manner described above with respect to FIGS. 9C, 9D, and 9E.

Optionally, at step 1004, specification of one or more filters of the linking parameter is obtained. For example, the filter can be an equality filter, a range filter, or a regular expression filter as described above with respect to FIG. 9D. For example, the application may obtain the specification of one or more filters of the linking parameter through a graphical user interface. For example, the application may obtain, but is not limited to obtaining, the specification of one or more filters of the linking parameter in the manner described above with respect to FIG. 9D.

At step 1006, selection of a target entity type is received. For example, the target entity type can be an event entity type, an object entity type, or an electronic note entity type, or any sub-entity type thereof. For example, the application may receive selection of the target entity type from the user through a graphical user interface. For example, the application may receive, but is not limited to receiving, selection of the target entity type in the manner described above with respect to FIG. 9G.

At step 1008, a search of a connected entity graph is conducted. The search starts at the beginning entity selected at step 1002. The search is for any target entities of the target entity type selected at step 1006 that are within a predetermined degree of separation from the beginning entity and that have a first degree connection in the connected entity graph with the beginning entity or one of the other target entities that satisfies the linking parameter.

The search may be coordinated by a dispatch server (e.g., 312) based on search information received from the application. The search information may specify the beginning entity selected at step 1002, the linking parameter and any filter(s) thereof selected at step 1004, and the target entity type selected at step 1006. In coordinating the search, the dispatch server may interact with a graph database system (e.g., 314) and/or a graph search system (e.g., 316) to determine the target entities in the connected entity graph that should be returned as results of the search. The graph search system may index entities 402 in the connected entity graph by the links 422 that connect them to other entities 402 in the connected entity graph. For example, Meeting entity 402C-8 may be indexed by the entity id 404 of Electronic Note entity 402C-9 and the link type 428 of link 422C-9 such that if the index is consulted for all entities 402 linked to Electronic Note entity 402C-9 with that link type 428, then Meeting entity 402C-8 is identified in the index. In addition or alternatively, the graph search system may index entities 402 in the connected entity graph by the entities 402 they are linked 422 with in the connected entity graph. For example, Meeting entity 402C-8 may be indexed by the entity id 404 of Electronic Note entity 402C-9 such that if the index is consulted for all entities 402 linked to Electronic Note entity 402C-9, then Meeting entity 402C-8 is identified in the index. Entities 402 may also be indexed by other information such as, for example, the values 420 of properties 412 of the entities 402.

In operation, the search at step 1008 proceeds as follows. Assuming the search depth is greater than one, then, at the first search depth, any entities 402 of the target entity type selected at step 1006 having a first degree basic or complex connection with the beginning entity selected at step 1002 and that satisfies the linking parameter selected at step 1004 are identified as target entities 402. Then, at the second and subsequent search depths, for each target entity 402 identified at the immediately prior search depth, any entries of the target entity type selected at step 1006 having a first degree basic or complex connection with the target entity 402 and that satisfies the linking parameter selected at step 1004 are also identified as target entities 402. The search stops when the predetermined search depth has been reached or no target entities 402 are identified at a search depth.

At step 1010, the result of the search is presented to the user in a graphical user interface. For example, the application may present the search result to the user at the user computer based on search result information received from the electronic note management system. The search result information may identify any target entities 402 that are included in the search result. And if there are target entities 402 identified at the first search depth, the search result information may identify the first degree connections between the beginning entity 402 selected at step 1002 and the target entities 402 identified at the first search depth. And if there are target entities 402 identified at the second or subsequent search depths, the search result information may identify the first degree connections between target entities 402.

The search result presented at step 1010 may be displayed as a graph comprising nodes and edges. Each node represents either the beginning entity 402 selected at step 1002 or a target entity 402 identified at step 1008. Each edge connects two of the nodes. Each edge connected to the node that represents the beginning entity 402 represents at least one first degree connection in the connected entity graph between the beginning entity 402 and a target entity 402 that satisfies the linking parameter selected at step 1004. If the first degree connection is a complex connection, then a complex connection indicator may overlay the edge. Each node connected between two nodes representing two target entities 402 represents at least one first degree connection in the connected entity graph between the two target entities 402 that satisfies the linking parameter selected at step 1004.

Extensions and Alternatives

While the invention is described in some detail with specific reference to exemplary embodiments and certain alternatives, there is no intent to limit the invention to those particular embodiments or those specific alternatives. For instance, those skilled in the art will appreciate that modifications may be made to the exemplary embodiments without departing from the teachings of the present invention.

The invention claimed is:

1. A computer-implemented method of providing an improvement in searching for electronic notes via a connected entity graph, comprising:
   managing, by a processor, a connected entity graph of nodes and edges,
   each node of the nodes representing an entity having an entity type of a plurality of entity types,
   at least one node of the nodes having an entity type of an electronic note,
   each edge of the edges representing a relationship between two entities;
   receiving a request for a search specifying a beginning entity, a linking parameter, and a filter on the linking parameter,
   the linking parameter specifying a property of an intermediary entity linking a source entity and a target entity during the search,
   the filter constraining a value of the property;
   searching the connected entity graph based on the request;
   causing a display of a search result.

2. The computer-implemented method of claim 1,
   the request including multiple filters on the linking parameter,
   the performing comprising finding a specific intermediary entity that satisfies all the multiple filters.

3. The computer-implemented method of claim 1, the plurality of entity types including an event type and an object type.

4. The computer-implemented method of claim 1, further comprising causing presenting a graphical user interface (GUI) that includes one or more screens for allowing a specification of one or more filters respectively for one or more search depths.

5. The computer-implemented method of claim 4,
   the GUI including a plurality of buttons corresponding to the plurality of entity types,
   the GUI allowing a specification of a certain entity type of the intermediary entity via a selection of a button of the plurality of buttons.

6. The computer-implemented method of claim 4,
   the GUI including a button corresponding to a link,
   the GUI allowing a specification of a link type of a certain link via a selection of the button.

7. The computer-implemented method of claim 4, the GUI including a first panel for the display of the search result next to a second panel for specifying the one or more filters within a certain screen of the one or more screens.

8. The computer-implemented method of claim 7, a current source entity in a search result at a current search depth is a previous target entity in a search result at a previous search depth.

9. The computer-implemented method of claim 4, the GUI including a first option of applying any of the one or more filters and a second option of applying all of the one or more filters at a current search depth.

10. The computer-implemented method of claim 1, the request further specifying a target entity type.

11. One or more non-transitory, computer-readable storage media storing one or more sequences of instructions which, when executed cause one or more processors to perform:

managing a connected entity graph of nodes and edges,
each node of the nodes representing an entity having an entity type of a plurality of entity types,
at least one node of the nodes having an entity type of an electronic note,
each edge of the edges representing a relationship between two entities;
receiving a request for a search specifying a beginning entity, a linking parameter, and a filter on the linking parameter,
the linking parameter specifying a property of an intermediary entity linking a source entity and a target entity during the search,
the filter constraining a value of the property;
searching the connected entity graph based on the request;
causing a display of a search result.

12. The one or more non-transitory, computer-readable storage media of claim 11,
the request including multiple filters on the linking parameter,
the performing comprising finding a specific intermediary entity that satisfies all the multiple filters.

13. The one or more non-transitory, computer-readable storage media of claim 11, the plurality of entity types including an event type and an object type.

14. The one or more non-transitory, computer-readable storage media of claim 11, the one or more sequences of instructions further causing the one or more processors to perform causing presenting a graphical user interface (GUI) that includes one or more screens for allowing a specification of one or more filters respectively for one or more search depths.

15. The one or more non-transitory, computer-readable storage media of claim 14,
the GUI including a plurality of buttons corresponding to the plurality of entity types,
the GUI allowing a specification of a certain entity type of the intermediary entity via a selection of a button of the plurality of buttons.

16. The one or more non-transitory, computer-readable storage media of claim 14,
the GUI including a button corresponding to a link,
the GUI allowing a specification of a link type of a certain link via a selection of the button.

17. The one or more non-transitory, computer-readable storage media of claim 14, the GUI including a first panel for the display of the search result next to a second panel for specifying the one or more filters within a certain screen of the one or more screens.

18. The one or more non-transitory, computer-readable storage media of claim 17, a current source entity in a search result at a current search depth is a previous target entity in a search result at a previous search depth.

19. The one or more non-transitory, computer-readable storage media of claim 14, the GUI including a first option of applying any of the one or more filters and a second option of applying all of the one or more filters at a current search depth.

20. The one or more non-transitory, computer-readable storage media of claim 11, the request further specifying a target entity type.

* * * * *